(12) United States Patent
Frey et al.

(10) Patent No.: US 11,846,207 B2
(45) Date of Patent: Dec. 19, 2023

(54) NOZZLE ASSEMBLY WITH ALTERNATING INSERTED VANES FOR A TURBINE ENGINE

(71) Applicant: General Electric Company, Schenectady, NY (US)

(72) Inventors: David Alan Frey, West Chester, OH (US); Jeffrey Douglas Rambo, Mason, OH (US); Alexander Martin Sener, Santa Monica, CA (US); Kirk Douglas Gallier, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/685,523

(22) Filed: Mar. 3, 2022

(65) Prior Publication Data
US 2022/0341339 A1    Oct. 27, 2022

Related U.S. Application Data

(63) Continuation of application No. 16/817,742, filed on Mar. 13, 2020, now Pat. No. 11,268,394.

(51) Int. Cl.
*F01D 9/04* (2006.01)
*F01D 25/24* (2006.01)
(Continued)

(52) U.S. Cl.
CPC .............. *F01D 9/042* (2013.01); *F01D 5/18* (2013.01); *F01D 25/246* (2013.01); *F02C 7/28* (2013.01);
(Continued)

(58) Field of Classification Search
CPC ..... F01D 9/00; F01D 9/02; F01D 9/04; F01D 9/041; F01D 9/042; F01D 5/18;
(Continued)

(56) References Cited

U.S. PATENT DOCUMENTS 3,842,595 A   10/1974   Smith et al.
4,395,195 A    7/1983   DeCosmo et al.
(Continued)

FOREIGN PATENT DOCUMENTS

EP    2466074 A1    6/2012

OTHER PUBLICATIONS

Pratt & Whitney, PurePower Engine Family Specs Chart, http://www.pw.utc.com/Content/PurePowerPW1000G_Engine/pdf/B-11_PurePowerEngineFamily_SpecsChart.pdf.

*Primary Examiner* — Elton K Wong
(74) *Attorney, Agent, or Firm* — Dority & Manning, P.A.

(57) ABSTRACT

A nozzle assembly for a gas turbine engine and methods for assembling a nozzle assembly are provided. In one example aspect, the nozzle assembly includes an outer wall and an inner wall radially spaced from the outer wall. The outer wall defines a plurality of mounting openings spaced circumferentially from one another. The inner wall defines a plurality of mounting openings spaced circumferentially from one another. The mounting openings defined by the inner wall are positioned circumferentially between adjacent mounting openings defined by the outer wall. The nozzle assembly includes vanes that are inserted through the mounting openings of the outer wall in a radially inward direction and vanes that are inserted through the mounting openings of the inner wall in a radially outward direction in an alternating manner.

19 Claims, 14 Drawing Sheets

(51) Int. Cl.
  *F02C 7/28* (2006.01)
  *F01D 5/18* (2006.01)
  *F01D 5/28* (2006.01)
(52) U.S. Cl.
  CPC .............. *F01D 5/282* (2013.01); *F01D 5/284* (2013.01); *F05D 2230/60* (2013.01); *F05D 2300/6033* (2013.01)
(58) Field of Classification Search
  CPC ........ F01D 5/282; F01D 5/284; F01D 25/246; F02C 7/28; F05D 2230/60; F05D 2300/6033
  See application file for complete search history.

(56) References Cited

U.S. PATENT DOCUMENTS

| | | | |
|---|---|---|---|
| 4,424,667 A | 1/1984 | Fanning | |
| 4,686,823 A | 8/1987 | Coburn et al. | |
| 4,990,056 A | 2/1991 | McClain et al. | |
| 5,207,064 A | 5/1993 | Ciokajlo et al. | |
| 5,392,614 A | 2/1995 | Coffinberry | |
| 5,406,787 A | 4/1995 | Terrier | |
| 5,443,590 A | 8/1995 | Ciokajlo et al. | |
| 5,449,272 A | 9/1995 | Boyd et al. | |
| 5,465,571 A | 11/1995 | Clark | |
| 5,630,700 A | 5/1997 | Olsen et al. | |
| 6,200,092 B1 | 3/2001 | Koschier | |
| 6,409,472 B1 * | 6/2002 | McMahon | F01D 25/246 415/189 |
| 6,524,065 B2 | 2/2003 | Briesenick et al. | |
| 6,543,995 B1 * | 4/2003 | Honda | F01D 25/246 415/189 |
| 6,619,030 B1 | 9/2003 | Seda et al. | |
| 6,648,597 B1 * | 11/2003 | Widrig | C04B 37/005 415/200 |
| 6,835,020 B2 | 12/2004 | Wang et al. | |
| 6,893,214 B2 | 5/2005 | Alford et al. | |
| 6,991,427 B2 | 1/2006 | Scott | |
| 7,062,920 B2 | 6/2006 | McMasters et al. | |
| 7,186,078 B2 | 3/2007 | Tanaka | |
| 7,249,462 B2 | 7/2007 | Aumont et al. | |
| 7,329,087 B2 | 2/2008 | Cairo et al. | |
| 7,445,425 B2 | 11/2008 | Ferra et al. | |
| 7,546,743 B2 | 6/2009 | Bulman et al. | |
| 7,757,495 B2 | 7/2010 | Bessagnet et al. | |
| 7,950,234 B2 | 5/2011 | Radonovich et al. | |
| 8,141,371 B1 | 3/2012 | Habarou et al. | |
| 8,240,980 B1 | 8/2012 | Liang | |
| 8,246,305 B2 | 8/2012 | Lecuyer et al. | |
| 8,430,629 B2 * | 4/2013 | Turi | F01D 9/044 415/189 |
| 8,753,073 B2 | 6/2014 | Albers et al. | |
| 8,776,525 B2 | 7/2014 | Oechsle | |
| 8,887,487 B2 | 11/2014 | Kupratis et al. | |
| 8,905,711 B2 | 12/2014 | Suciu et al. | |
| 8,943,832 B2 | 2/2015 | Uhm et al. | |
| 9,039,364 B2 | 5/2015 | Alvanos et al. | |
| 9,169,736 B2 | 10/2015 | Hayford et al. | |
| 9,255,487 B2 | 2/2016 | Mayer et al. | |
| 9,308,708 B2 | 4/2016 | Kleinow | |
| 9,651,258 B2 | 5/2017 | Graves et al. | |
| 9,863,260 B2 | 1/2018 | Weaver | |
| 10,125,619 B2 | 11/2018 | Kray et al. | |
| 2007/0065285 A1 * | 3/2007 | Cairo | F01D 5/147 416/193 A |
| 2008/0063521 A1 | 3/2008 | Bogue et al. | |
| 2010/0139847 A1 | 6/2010 | Law et al. | |
| 2010/0326078 A1 | 12/2010 | Pieussergues et al. | |
| 2011/0271684 A1 | 11/2011 | Corsmeier et al. | |
| 2013/0000324 A1 | 1/2013 | Alvanos et al. | |
| 2014/0169957 A1 * | 6/2014 | Kanjiyani | F01D 9/042 29/888.025 |
| 2014/0271144 A1 | 9/2014 | Landwehr et al. | |
| 2014/0363276 A1 | 12/2014 | Vetters et al. | |
| 2015/0204447 A1 | 7/2015 | Kloepfer | |
| 2015/0292402 A1 | 10/2015 | Razak | |
| 2015/0308277 A1 | 10/2015 | Verhelst | |
| 2015/0321382 A1 | 11/2015 | Jarmon | |
| 2015/0377061 A1 | 12/2015 | Boeck | |
| 2016/0001873 A1 | 1/2016 | Schwarz | |
| 2016/0003051 A1 * | 1/2016 | Slavens | B22F 7/08 415/208.1 |
| 2016/0032778 A1 | 2/2016 | Sanchez | |
| 2016/0102574 A1 | 4/2016 | Peters | |
| 2016/0115986 A1 | 4/2016 | Freis et al. | |
| 2016/0123187 A1 | 5/2016 | Leslie et al. | |
| 2016/0131084 A1 | 5/2016 | Kupratis et al. | |
| 2016/0177758 A1 | 6/2016 | Clum et al. | |
| 2016/0201515 A1 | 7/2016 | Chang | |
| 2016/0208700 A1 | 7/2016 | Minnear et al. | |
| 2016/0265389 A1 | 9/2016 | Jarmon | |
| 2016/0265430 A1 | 9/2016 | Schwarz | |
| 2016/0326896 A1 | 11/2016 | Jamison | |
| 2017/0146241 A1 | 5/2017 | Graves et al. | |
| 2017/0248320 A1 | 8/2017 | Hannwacker et al. | |
| 2017/0370583 A1 | 12/2017 | Marusko et al. | |
| 2018/0016924 A1 | 1/2018 | Gallier et al. | |
| 2018/0172026 A1 | 6/2018 | Urac et al. | |
| 2018/0216575 A1 | 8/2018 | Miller et al. | |
| 2018/0216822 A1 | 8/2018 | Noe et al. | |
| 2018/0216823 A1 | 8/2018 | Reynolds et al. | |
| 2018/0216824 A1 | 8/2018 | Reynolds et al. | |
| 2018/0238181 A1 | 8/2018 | Reynolds et al. | |
| 2018/0238182 A1 | 8/2018 | Shapiro et al. | |
| 2018/0238184 A1 | 8/2018 | Reynolds et al. | |
| 2018/0238232 A1 | 8/2018 | Reynolds et al. | |
| 2018/0266264 A1 | 9/2018 | Kerns et al. | |
| 2018/0355804 A1 | 12/2018 | Miller et al. | |
| 2019/0063246 A1 * | 2/2019 | Frey | F01D 9/041 |
| 2019/0376397 A1 * | 12/2019 | Hunnewell | F01D 9/041 |

* cited by examiner

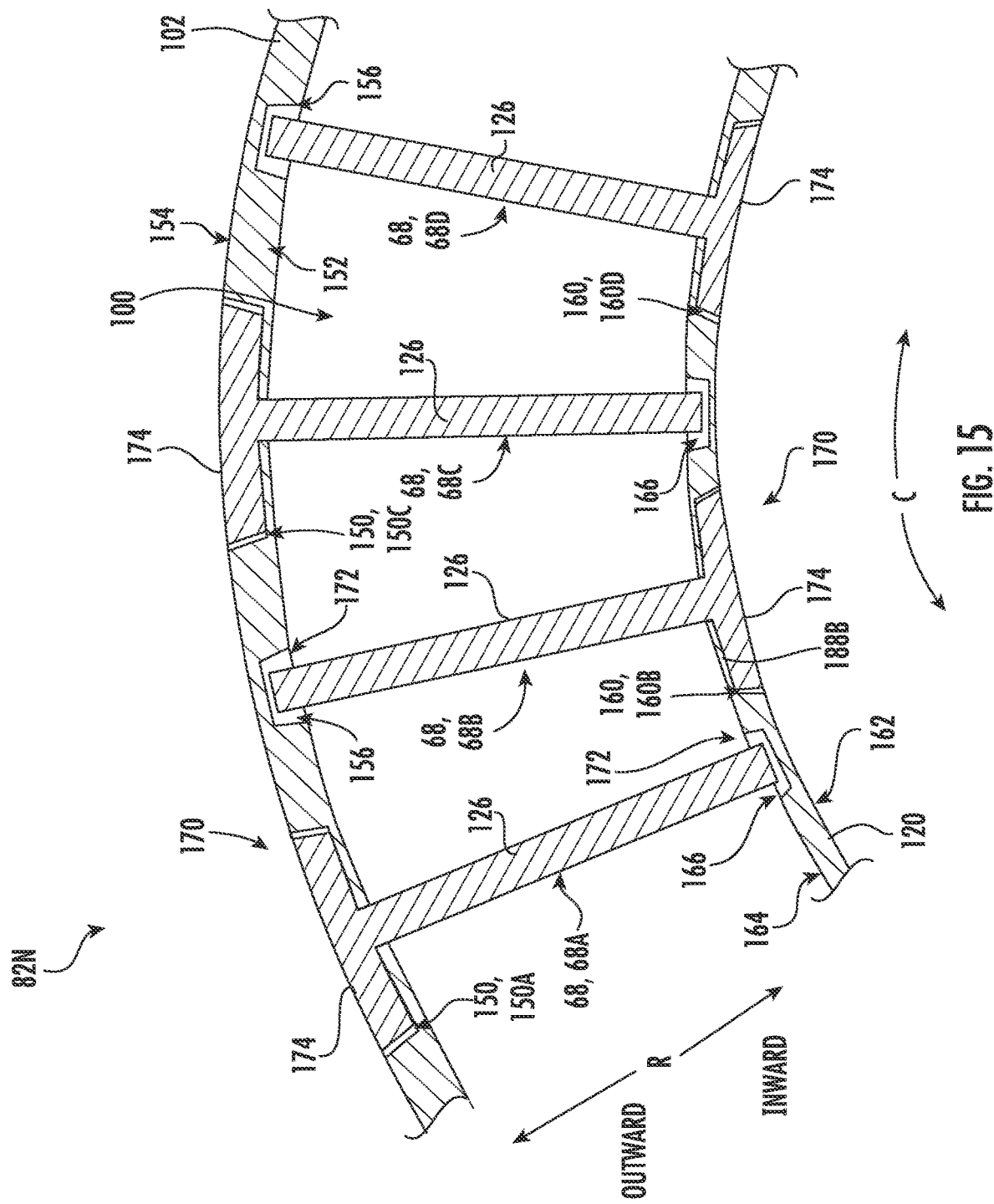

NOZZLE ASSEMBLY WITH ALTERNATING INSERTED VANES FOR A TURBINE ENGINE

CROSS-REFERENCE TO RELATED APPLICATION

This application is a continuation of U.S. application Ser. No. 16/817,742, filed Mar. 13, 2020, which is hereby incorporated by reference in its entirety.

FIELD

The subject matter of the present disclosure relates generally to turbine engines. More particularly, the subject matter of the present disclosure relates to nozzle assemblies of turbine engines.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

More particularly, the combustion section includes a combustor having a combustion chamber defined by a combustor liner. Downstream of the combustor, the turbine section includes one or more stages, for example, each stage may include a plurality of stationary nozzle airfoils as well as a plurality of blade airfoils attached to a rotor that is driven by the flow of combustion gases against the blade airfoils. The turbine section may have other configurations as well. In any event, a flow path is defined by an inner boundary and an outer boundary, which both extend from the combustor through the stages of the turbine section.

Typically, the inner and outer boundaries defining the flow path are formed of separate components. For example, an outer liner of the combustor, a separate outer band of a nozzle portion of a turbine stage, and a separate shroud of a blade portion of the turbine stage usually define at least a portion of the outer boundary of the flow path. However, utilizing separate components to form each of the outer boundary and the inner boundary requires a great number of parts, e.g., one or more seals may be required at each interface between the separate components to minimize fluid leakage to or from the flow path, which can increase the complexity and weight of the gas turbine engine. Therefore, flow path assemblies having a unitary outer boundary structure, where two or more components of the outer boundary are integrated into a single piece, and/or a unitary inner boundary structure, where two or more components of the inner boundary are integrated into a single piece, are desirable. While forming unitary boundary structures has many benefits, forming nozzle assemblies along such unitary boundary structures has proven challenging. For instance, the nozzle vanes can be formed integrally with the unitary structures to form the nozzle assembly. However, such a unitary structure can be complex and expensive to manufacture. The nozzle vanes can also be inserted through the boundary structures. However, the space between such nozzles is limited, making fixturing and sealing of the vanes with the boundary structures difficult.

Accordingly, improved turbine engines and nozzle assemblies therefore that address one or more of the challenges noted above would be desirable. Further, a method for assembling a nozzle assembly of a turbine engine that addresses one or more of the challenges noted above would be beneficial.

BRIEF DESCRIPTION

Aspects and advantages of the invention will be set forth in part in the following description, or may be obvious from the description, or may be learned through practice of the invention.

In one aspect, a nozzle assembly for a turbine engine defining an axial direction, a radial direction, a circumferential direction, and an axial centerline extending along the axial direction is provided. The nozzle assembly includes an outer wall defining mounting openings spaced from one another along the circumferential direction. The nozzle assembly also includes an inner wall defining mounting openings spaced from one another along the circumferential direction, the inner wall and the outer wall defining a flow path. Further, the nozzle assembly includes a plurality of first vanes each having an airfoil and a mounting flange, wherein the airfoil of each first vane extends through one of the mounting openings of the outer wall and is positioned at least in part within the flow path, and wherein the mounting flange of each first vane is positioned outward of the outer wall along the radial direction with respect to the axial centerline. In addition, the nozzle assembly includes a plurality of second vanes each having an airfoil and a mounting flange, wherein the airfoil of each second vane extends through one of the mounting openings of the inner wall and is positioned at least in part within the flow path, and wherein the mounting flange of each second vane is positioned inward of the inner wall along the radial direction with respect to the axial centerline. The plurality of first vanes and the plurality of second vanes are arranged in an alternating manner along the circumferential direction.

In another aspect, a turbine engine defining an axial direction, a radial direction, and a circumferential direction is provided. The turbine engine includes a combustion section and a turbine section positioned downstream of the combustion section. Further, the turbine engine includes an inner wall defining mounting openings spaced from one another along the circumferential direction. Moreover, the turbine engine includes an outer wall including a combustor portion extending through the combustion section and a turbine portion extending through at least a portion of the turbine section, the combustor portion and the turbine portion being integrally formed as a single unitary structure, wherein the turbine portion of the outer wall defines mounting openings spaced from one another along the circumferential direction, wherein each mounting opening of the inner wall is positioned between adjacent mounting openings of the outer wall along the circumferential direction. Furthermore, the turbine engine includes a plurality of vanes extending between the outer wall and the inner wall along the radial direction, wherein the plurality of vanes are inserted inward through the mounting openings of the outer wall along the radial direction and outward through the mounting openings of the inner wall along the radial direction in an alternating manner.

In a further aspect, a turbine engine defining an axial direction, a radial direction, a circumferential direction, and an axial centerline extending along the axial direction is provided. The turbine engine includes a combustion section and a turbine section positioned downstream of the combustion section. The turbine engine also includes an inner wall defining a mounting opening. The turbine engine further has an outer wall including a combustor portion extending through the combustion section and a turbine portion extending through at least a portion of the turbine section, the combustor portion and the turbine portion being integrally formed as a single unitary structure, wherein the turbine portion of the outer wall defines a mounting opening. The turbine engine also has a first vane having an airfoil and a mounting flange, wherein the airfoil of the first vane extends through the mounting opening of the outer wall, and wherein the mounting flange of the first vane is positioned outward of the outer wall along the radial direction with respect to the axial centerline. The turbine engine also includes a second vane positioned adjacent the first vane along the circumferential direction and having an airfoil and a mounting flange, wherein the airfoil of the second vane extends through the mounting opening of the inner wall, and wherein the mounting flange of the second vane is positioned inward of the inner wall along the radial direction with respect to the axial centerline.

In yet another aspect, a method for assembling a nozzle assembly for a turbine engine defining an axial direction, a radial direction, and a circumferential direction is provided. The method includes inserting a plurality of vanes inward through an outer wall of the nozzle assembly along the radial direction; inserting a plurality of vanes outward through an inner wall of the nozzle assembly along the radial direction, the inner wall being spaced from the outer wall along the radial direction, and wherein the plurality of vanes inserted inward through the outer wall along the radial direction alternate along the circumferential direction with the plurality of vanes inserted outward through the inner wall along the radial direction.

In a further aspect, a method of assembling a nozzle assembly for a turbine engine defining an axial direction, a radial direction, and a circumferential direction is provided. The method includes inserting a first vane inward through an outer wall of the nozzle assembly along the radial direction. The method also includes inserting, adjacent the first vane along the circumferential direction, a second vane outward through an inner wall of the nozzle assembly along the radial direction, the inner wall being spaced from the outer wall along the radial direction.

In some implementations, the method further includes inserting, adjacent the first vane along the circumferential direction and opposite the second vane, a third vane inward through the outer wall of the nozzle assembly along the radial direction. In this way, the first vane is positioned between the second vane and the third vane along the circumferential direction. The first vane and the third vane are both inserted inward through the outer wall of the nozzle assembly along the radial direction and the second vane is inserted outward through the inner wall of the nozzle assembly along the radial direction.

In yet other implementations, the method further includes inserting, adjacent the second vane along the circumferential direction and opposite the first vane, a third vane outward through the inner wall of the nozzle assembly along the radial direction. In this way, the second vane is positioned between the first vane and the third vane along the circumferential direction. The second vane and the third vane are both inserted outward through the inner wall of the nozzle assembly along the radial direction and the first vane is inserted inward through the outer wall of the nozzle assembly along the radial direction.

In yet another aspect, a nozzle assembly for a turbine engine defining an axial direction, a radial direction, and a circumferential direction is provided. The flow path assembly includes an outer wall defining mounting openings spaced from one another along the circumferential direction. The nozzle assembly also includes an inner wall defining mounting openings spaced from one another along the circumferential direction, wherein each mounting opening of the inner wall is positioned between adjacent mounting openings of the outer wall along the circumferential direction, the inner wall and the outer wall defining a flow path. Further, the nozzle assembly includes a plurality of vanes inserted inward through the mounting openings of the outer wall and into the flow path along the radial direction and outward through the mounting openings of the inner wall and into the flow path along the radial direction in an alternating manner.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 15 provides another schematic axial cross-sectional view of a portion of a nozzle assembly for a turbine engine according to example embodiments of the present subject matter.

DETAILED DESCRIPTION

Figure 1:
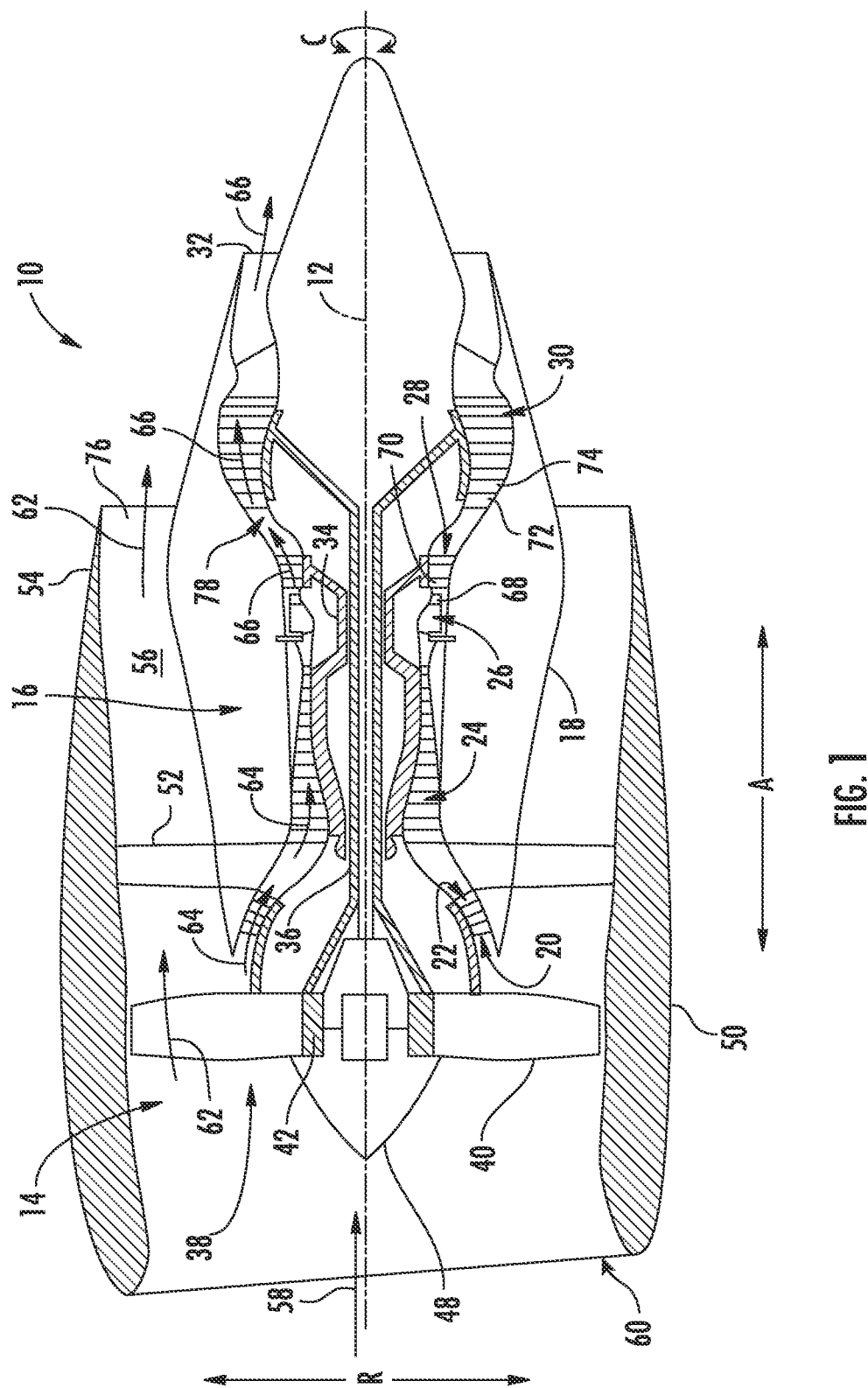
FIG. 1 provides a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. Further, as used herein, the terms "axial" or "axially" refer to a dimension along a longitudinal axis of an engine. The term "forward" used in conjunction with "axial" or "axially" refers to a direction toward the engine inlet, or a component being relatively closer to the engine inlet as compared to another component. The term "rear" used in conjunction with "axial" or "axially" refers to a direction toward the engine nozzle, or a component being relatively closer to the engine nozzle as compared to another component. The terms "radial" or "radially" refer to a dimension extending between an axial centerline of the engine and an outer engine circumference or outer annulus. Radially inward is toward the axial centerline and radially outward is away from the axial centerline.

Exemplary aspects of the present disclosure are directed to a nozzle assembly for a gas turbine engine and methods for assembling a nozzle assembly. In one example aspect, the nozzle assembly includes an outer wall and an inner wall radially spaced from the outer wall. The outer wall defines a plurality of mounting openings spaced circumferentially from one another. Likewise, the inner wall defines a plurality of mounting openings spaced circumferentially from one another. The mounting openings defined by the inner wall are positioned circumferentially between adjacent mounting openings defined by the outer wall. The mounting openings defined by the outer and inner wall are axially aligned. The nozzle assembly includes vanes that are inserted through the mounting openings of the outer wall in a radially inward direction and vanes that are inserted through the mounting openings of the inner wall in a radially outward direction in an alternating manner. For instance, in some example aspects, every other vane around the annulus of the nozzle assembly is inserted radially inward through the outer wall and every other vane around the annulus of the nozzle assembly is inserted radially outward through the inner wall. The inserted vanes are positioned such that they extend through a flow path defined between the outer and inner walls. Moreover, the vanes inserted radially inward through the mounting openings of the outer wall can be located and constrained within a locating groove positioned radially opposite the mounting opening through which the vane is inserted. Similarly, the vanes inserted radially outward through the mounting openings of the inner wall can be located and constrained within a locating groove positioned radially opposite the mounting opening through which the vane is inserted.

FIG. 1 provides a schematic cross-sectional view of a gas turbine engine in accordance with an exemplary embodiment of the present disclosure. More particularly, for the embodiment of FIG. 1, the gas turbine engine is a high-bypass turbofan jet engine, referred to herein as "turbofan engine 10." As shown in FIG. 1, the turbofan engine 10 defines an axial direction A (extending parallel to a longitudinal or axial centerline 12 provided for reference) and a radial direction R. A circumferential direction C extends three hundred sixty degrees (360°) around the axial centerline 12.

The turbofan 10 includes a fan section 14 and a core turbine engine 16 disposed downstream of the fan section 14. The exemplary core turbine engine 16 depicted generally includes a substantially tubular outer casing 18 that defines an annular core inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided.

The fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears can be included for stepping down the rotational speed of the LP shaft 36 to a more efficient rotational fan speed.

Referring still to the exemplary embodiment of FIG. 1, disk 42 is covered by rotatable spinner 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The nacelle 50 is supported relative to the core turbine engine 16 by a plurality of circumferentially-spaced outlet guide vanes 52. Moreover, a downstream section 54 of the nacelle 50 can extend over an outer portion of the core turbine engine 16 so as to define a bypass airflow passage 56 therebetween as shown in FIG. 1.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

In some embodiments, components of turbofan engine 10, particularly components within hot gas path 78, such as components of combustion section 26, HP turbine 28, and/or LP turbine 30, can be formed of a ceramic matrix composite (CMC) material, which is a non-metallic material having high temperature capability. Other components of turbofan engine 10, such as components of HP compressor 24, can be formed of a CMC material as well. Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite).

In certain embodiments, bundles of the fibers, which can include a ceramic refractory material coating, are formed as a reinforced tape, such as a unidirectional reinforced tape. A plurality of the tapes can be laid up together (e.g., as plies) to form a preform component. The bundles of fibers can be impregnated with a slurry composition prior to forming the preform or after formation of the preform. The preform may then undergo thermal processing, such as a cure or burn-out to yield a high char residue in the preform, and subsequent chemical processing, such as melt-infiltration or chemical vapor infiltration with silicon, to arrive at a component formed of a CMC material having a desired chemical composition. In other embodiments, the CMC material may be formed as, e.g., a carbon fiber cloth rather than as a tape.

As stated, components formed of a CMC material can be used within the hot gas path 78, such as within the combustion and/or turbine sections of engine 10. As an example, the combustion section 26 can include a combustor formed from a CMC material and/or one or more stages of the HP turbine 28 can be formed from a CMC material. However, as noted above, CMC components can be used in other sections of the turbofan engine 10 as well, such as the compressor and/or fan sections. In some embodiments, additionally or alternatively, other high temperature materials and/or other composite materials can be used to form one or more components of engine 10.

Figure 2:
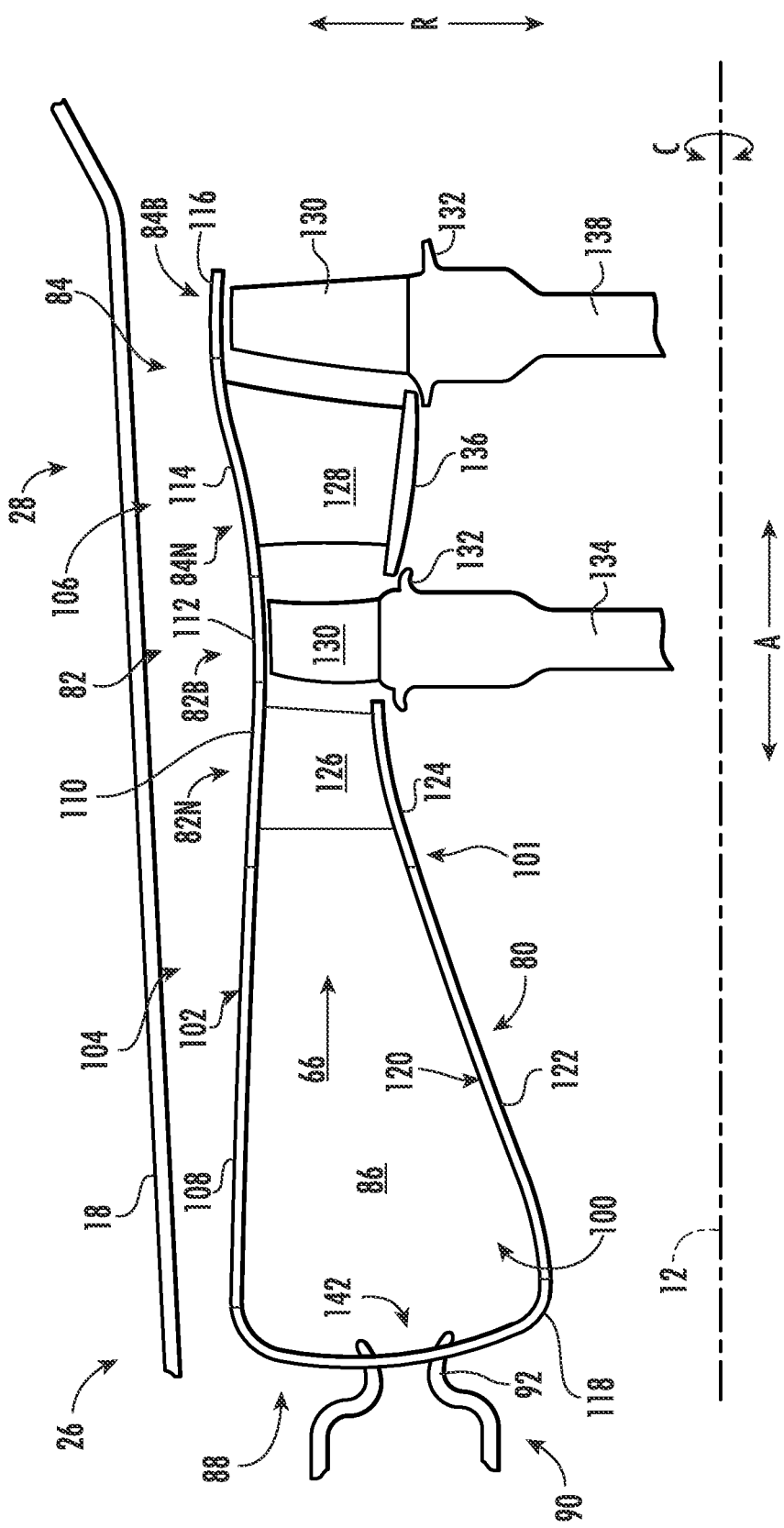
FIG. 2 provides a schematic cross-sectional view of a combustion section and a high pressure turbine section of the gas turbine engine of FIG. 1.

FIG. 2 provides a schematic cross-sectional view of the combustion section 26 and the HP turbine 28 of the turbine section of the turbofan engine 10 of FIG. 1. As shown, the combustion section 26 includes a generally annular combustor 80, and downstream of the combustion section 26, the HP turbine 28 includes a plurality of turbine stages. More particularly, for the depicted embodiment, the HP turbine 28 includes a first turbine stage 82 and a second turbine stage 84. In other embodiments, the HP turbine 28 can include a different number of turbine stages; for example, the HP turbine 28 can include one turbine stage or more than two turbine stages. The first turbine stage 82 is positioned immediately downstream of the combustion section 26 and the second turbine stage 84 is positioned immediately downstream of the first turbine stage 82. Further, each turbine stage 82, 84 includes a nozzle assembly and a blade assembly. The first turbine stage 82 includes a nozzle assembly 82N and a blade assembly 82B and the second turbine stage 84 includes a nozzle assembly 84N and a blade assembly 84B. The nozzle assembly 82N of the first turbine stage 82 is located immediately downstream of the combustion section 26 such that the nozzle assembly 82N of the first turbine stage 82 also may be referred to as a combustor discharge nozzle. Moreover, the combustor 80 defines a generally annular combustion chamber 86 such that the combustor 80 may be described as a generally annular combustor. That is, the combustor 80 extends annularly around the axial centerline 12 along the circumferential direction C.

Additionally, as described in detail below, a flow path 100 through the combustion section 26 and the HP turbine 28 is defined by an outer boundary and an inner boundary of a flow path assembly 101. The outer and inner boundaries form the flow path 100 for the combustion gases 66 to flow through the combustion section 26 and HP turbine 28; thus, the flow path 100 can include at least a portion of the hot gas path 78 (FIG. 1) described above. Further, in other embodiments, the flow path 100 can also extend through LP turbine 30 and jet exhaust 32 (FIG. 1); in still other embodiments, the flow path 100 can extend upstream of the combustion section 26, e.g., into HP compressor 24 (FIG. 1). As such, it will be appreciated that the inventive aspects disclosed herein can also apply to different sections, configurations, and/or assemblies of gas turbine engines and flow paths 100 and are not limited to assemblies within the combustion section 26 and the HP turbine 28.

For the depicted embodiment of FIG. 2, the outer and inner boundaries defining the flow path 100 along the combustion section 26 and at least a portion of the HP turbine 28 are defined by an outer wall 102 and an inner wall 120, respectively. Generally, the outer wall 102 is spaced outward of the inner wall 120 along the radial direction R. As shown, the outer wall 102 and the inner wall 120 define various portions of the outer and inner boundaries of the flow path 100. For instance, the outer wall 102 defines an outer liner portion 108 forming the outer boundary of the flow path 100 through the combustor 80. The outer wall 102 also defines an outer band portion 110 forming the outer boundary of the flow path 100 through the nozzle assembly 82N of the first turbine stage 82 and an outer band portion 114 forming the outer boundary of the flow path 100 through the nozzle assembly 84N of the second turbine stage 84. Further, the outer wall 102 defines a shroud portion 112 forming the outer boundary of the flow path 100 through the blade assembly 82B of the first turbine stage 82 and a shroud portion 116 forming the outer boundary of the flow path 100 through the blade assembly 84B of the second turbine stage 84. The shroud portion 112 of the outer wall 102 is positioned between the outer band portion 110 and the outer band portion 114 along the axial direction A.

Further, as illustrated in FIG. 2, the inner wall 120 defines an inner liner portion 122 forming the inner boundary of the flow path 100 through the combustor 80. The inner wall portion 120 also defines an inner band portion 124 forming the inner boundary of the flow path 100 through the nozzle assembly 82N of the first turbine stage 82. Although not shown unitary with the inner wall 120 in the depicted embodiment of FIG. 2, a blade platform 132 forms the inner boundary of the flow path 100 through the blade assembly 82B of the first stage turbine 82, an inner band 136 forms the inner boundary of the flow path 100 through the nozzle assembly 84N of the second stage turbine 84, and a blade platform 132 forms the inner boundary of the flow path 100 through the blade assembly 84B of the second stage turbine 84.

Moreover, a combustor dome 118 extends radially across a forward end 88 of the combustor 80. The combustor dome 118 can be a part of the outer wall 102, the inner wall 120, both the outer wall 102 and the inner wall 120 (e.g., a portion of the combustor dome 118 can be defined by the outer wall 102 and the remainder can be defined by the inner wall 120), or may be a separate component from the outer wall 102 and the inner wall 120. The combustor dome 118 defines an opening 142 for receipt of a fuel nozzle assembly 90 positioned at forward end 88. The fuel nozzle assembly 90, e.g., provides combustion chamber 86 with a mixture of fuel and compressed air from the compressor section, which is combusted within the combustion chamber 86 to generate a flow of combustion gases 66 through the flow path 100. The fuel nozzle assembly 90 may attach to the combustor dome 118 or may "float" relative to the combustor dome 118 and the flow path 100, i.e., the fuel nozzle assembly 90 need not be attached to the combustor dome 118. In the illustrated embodiment, the fuel nozzle assembly 90 includes a swirler 92, and in some embodiments, the swirler 92 can attach to the combustor dome 118, but alternatively, the swirler 92 can float relative to the combustor dome 118 and flow path 100. It will be appreciated that the fuel nozzle assembly 90 or swirler 92 can float relative to the combustor dome 118 and flow path 100 along both the radial direction R and the axial direction A or only along one or the other of the radial and axial directions R, A. Further, it will be understood that the combustor dome 118 can define a plurality of openings 142 spaced from one another along the circumferential direction C, each opening receiving a swirler 92 or other portion of fuel nozzle assembly 90.

As further shown in FIG. 2, the nozzle assemblies 82N, 84N include a plurality of vanes. Particularly, the nozzle assembly 82N includes a plurality of airfoils 126 (only one shown in FIG. 2) and the nozzle assembly 84N includes a plurality of airfoils 128 (only one shown in FIG. 2). Each nozzle airfoil 126 within the nozzle assembly 82N of the first turbine stage 82 extends from the outer band portion 110 of the outer wall 102 to the inner band portion 124 of the inner wall 120 along the radial direction R. The nozzle airfoils 126 are arranged in an annular array around the axial centerline 12 and are spaced from one another along the circumferential direction C. Similarly, each nozzle airfoil 128 within the nozzle assembly 84N of the second turbine stage 84 extends from the outer band portion 114 of the outer wall 102 to the inner band 136 along the radial direction R. The nozzle airfoils 128 are arranged in an annular array around the axial centerline 12 and are spaced from one another along the circumferential direction C.

A plurality of blade airfoils 130 are positioned in each of the blade assemblies 82B, 84B. Each blade airfoil 130 within the blade assembly 82B of the first turbine stage 82 is attached to blade platform 132, which in turn is attached to a first stage rotor 134. The blade airfoils 130 attached to the first stage rotor 134 via blade platform 132 are spaced circumferentially about the axial centerline 12. Similarly, each blade airfoil 130 within the blade assembly 84B of the second turbine stage 84 is attached to a blade platform 132, which in turn is attached to a second stage rotor 138. The blade airfoils 130 attached to the second stage rotor 138 via blade platform 132 are spaced circumferentially about the axial centerline 12. Each blade airfoil 130 extends radially outward from their respective blade platforms 132 toward the outer wall 102, i.e., the outer boundary of the flow path 100. A clearance gap is defined between a radially outer tip of each blade airfoil 130 and the outer wall 102 such that each turbine rotor 134, 138 is free to rotate within its respective turbine stage. Although not depicted, each turbine rotor 134, 138 of the HP turbine 28 is connected to the HP shaft 34 (FIG. 1). In such manner, the blade airfoils 130 can extract kinetic energy from the flow of combustion gases 66 through the flow path 100 defined by the HP turbine 28 as rotational energy applied to the HP shaft 34.

Accordingly, flow path 100 through the combustion section 26 and the HP turbine 28 is defined by a flow path assembly 101 having an inner boundary and an outer boundary, and the inner and outer boundaries define the flow path 100 for the combustion gases 66 through the combustion section 26 and HP turbine 28. Portions of the outer boundary of the flow path assembly 101 can be integrated or unified into a single piece outer wall 102 that defines the radially outer boundary of the gas flow path 100. For instance, the outer wall 102 can include a combustor portion extending through a combustion section, such as combustion section 26, and a turbine portion extending through at least a first turbine stage of a turbine section, such as first turbine stage 82 of HP turbine 28. The combustor portion and turbine portion can be integrally formed such that the combustor portion and the turbine portion are a single unitary structure, i.e., a unitary outer wall 102.

For the depicted embodiment of FIG. 2, for example, portions of the outer wall 102 are integrated or unified into a single piece. As shown, the outer wall 102 includes a combustor portion 104 extending through the combustion section 26 and a turbine portion 106 extending through at least the first turbine stage 82 and the second turbine stage 84 of the turbine section. In other embodiments, the turbine portion 106 can extend through fewer stages (e.g., through one turbine stage as just described) or through more stages (e.g., through one or more stages of the LP turbine 30 positioned downstream of HP turbine 28). The combustor portion 104 and the turbine portion 106 are integrally formed such that the combustor portion 104 and the turbine portion 106 are a single unitary structure, which is referred to herein as unitary outer wall 102.

The term "unitary" as used herein denotes that the associated component, such as the outer wall 102, is made as a single piece during manufacturing, i.e., the final unitary component is a single piece. Thus, a unitary component has a construction in which the integrated portions are inseparable and is different from a component comprising a plurality of separate component pieces that have been joined together and, once joined, are referred to as a single component even though the component pieces remain distinct and the single component is not inseparable (i.e., the pieces may be re-separated). The final unitary component may comprise a substantially continuous piece of material, or in other embodiments, may comprise a plurality of portions that are permanently bonded to one another. In any event, the various portions forming a unitary component are integrated with one another such that the unitary component is a single piece with inseparable portions.

As shown in FIG. 2, for this embodiment, the combustor portion 104 of the unitary structure forming the outer wall 102 includes the outer liner portion 108 of the combustor 80 and at least a portion of the combustor dome 118 that extends across the forward end 88 of the combustor 80. The turbine portion 106 of the outer wall 102 includes the outer band portion 110 of the nozzle assembly 82N of the first turbine stage 82, the shroud portion 112 of the blade assembly 82B of the first turbine stage 82, the outer band portion 114 of the nozzle assembly 84N of the second turbine stage 84, and the shroud portion 116 of the blade assembly 84B of the second turbine stage 84. These outer boundary components are integrated into a single piece to form the unitary structure that is outer wall 102. Thus, in the exemplary embodiment of FIG. 2, the outer liner portion 108, outer band portion 110, shroud portion 112, outer band portion 114, shroud portion 116, and at least a portion of the combustor dome 118 are integrally formed, i.e., constructed as a single unit or piece to form the integrated or unitary outer wall 102.

Further, for the depicted embodiment of FIG. 2, at least a portion of the inner wall 120 defining the inner boundary of the flow path 100 is integrated with the outer wall 102 to form an integrated flow path assembly 101. As shown, the combustor portion 104 further includes the inner liner portion 122 and the turbine portion 106 further includes the inner band portion 124 of the nozzle assembly 82N of the first stage turbine 82. In this way, the inner liner portion 122 and the inner band portion 124 of the inner wall 120 are integrated with the unitary outer wall 102. Accordingly, the outer liner portion 108, outer band portion 110, shroud portion 112, outer band portion 114, shroud portion 116, combustor dome portion 118, inner liner portion 122, and inner band portion 124 are integrally formed as a single unitary structure.

In alternative example embodiments, some of the portions of the outer boundary and the inner boundary need not be integrally formed as a single unitary structure. For instance, in some embodiments, the combustor dome 118 can be a separate component from the outer wall 102 (formed of the outer liner portion 108, outer band portion 110, shroud portion 112, outer band portion 114, and shroud portion 116) and the inner wall 120 (formed of the inner liner portion 122 and the inner band portion 124). In yet other embodiments, only the outer liner portion 108, outer band portion 110, shroud portion 112, outer band portion 114, and shroud portion 116 are integrally formed as a single unitary structure while the combustor dome 118, inner liner portion 122, and inner band portion 124 are separate components. In yet other embodiments, the outer liner portion 108, outer band portion 110, shroud portion 112, outer band portion 114, shroud portion 116, and combustor dome 118 are integrally formed as a single unitary structure while the inner liner portion 122 and inner band portion 124 are separate components. In some embodiments, the outer liner portion 108 and the outer band portion 110 are integrally formed as a single unitary structure while the remaining components are separate components. In further embodiments, the outer liner portion 108, outer band portion 110, shroud portion 112, outer band portion 114, shroud portion 116, combustor dome 118, and inner liner portion 122 are integrally formed as a single unitary structure while the inner band portion 124 is a separate component. In some further embodiments, the outer liner portion 108, outer band portion 110, shroud portion 112, outer band portion 114, shroud portion 116, and combustor dome 118 are integrally formed as a single unitary structure while the inner liner portion 122 and inner band portion 124 are integrally formed as a single unitary structure, and wherein the two unitary structures can be attached or otherwise connected to one another. As will be appreciated, other combinations of portions of the flow path assembly 101 can be integrally formed with one another as a single unitary piece or can be separate components.

Integrating various components of the outer and inner boundaries of the flow path assembly 101 as described above can reduce the number of separate pieces or components within engine 10, as well as reduce the weight, leakage, and complexity of the engine 10, compared to known gas turbine engines. For instance, known gas turbine engines employ seals or sealing mechanisms at the interfaces between separate pieces of the flow path assembly to attempt to minimize leakage of combustion gases from the flow path. By integrating the outer boundary, for example, as described with respect to unitary outer wall 102, split points or interfaces between the outer combustor liner and first turbine stage outer band, the first turbine stage outer band and the first turbine stage shroud, etc. can be eliminated, thereby eliminating leakage points as well as seals or sealing mechanisms required to prevent leakage. Similarly, by integrating components of the inner boundary, split points or interfaces between the integrated inner boundary components are eliminated, thereby eliminating leakage points and seals or sealing mechanisms required at the inner boundary. Accordingly, undesired leakage, as well as unnecessary weight and complexity, can be avoided by utilizing unitary components in the flow path assembly. Other advantages of unitary outer wall 102, unitary inner wall 120, and/or a unitary flow path assembly 101 will be appreciated by those of ordinary skill in the art.

In some embodiments, nozzle vanes can be inserted through mounting openings defined in the outer and inner outer walls 102, 120 to form a nozzle assembly of the flow path assembly 100, e.g. the nozzle assembly 82N of the first turbine stage 82, the nozzle assembly 84N of the second turbine stage 84, etc. An example manner in which nozzle vanes can be inserted through the outer and inner outer walls 102, 120 and positioned in place to form to form a nozzle assembly of flow path assembly 101 is provided below. Such methods and resulting nozzle assemblies are particularly useful for flow path assemblies with continuous CMC boundaries, such as the flow path assembly 101 of FIG. 2.

Figure 3:
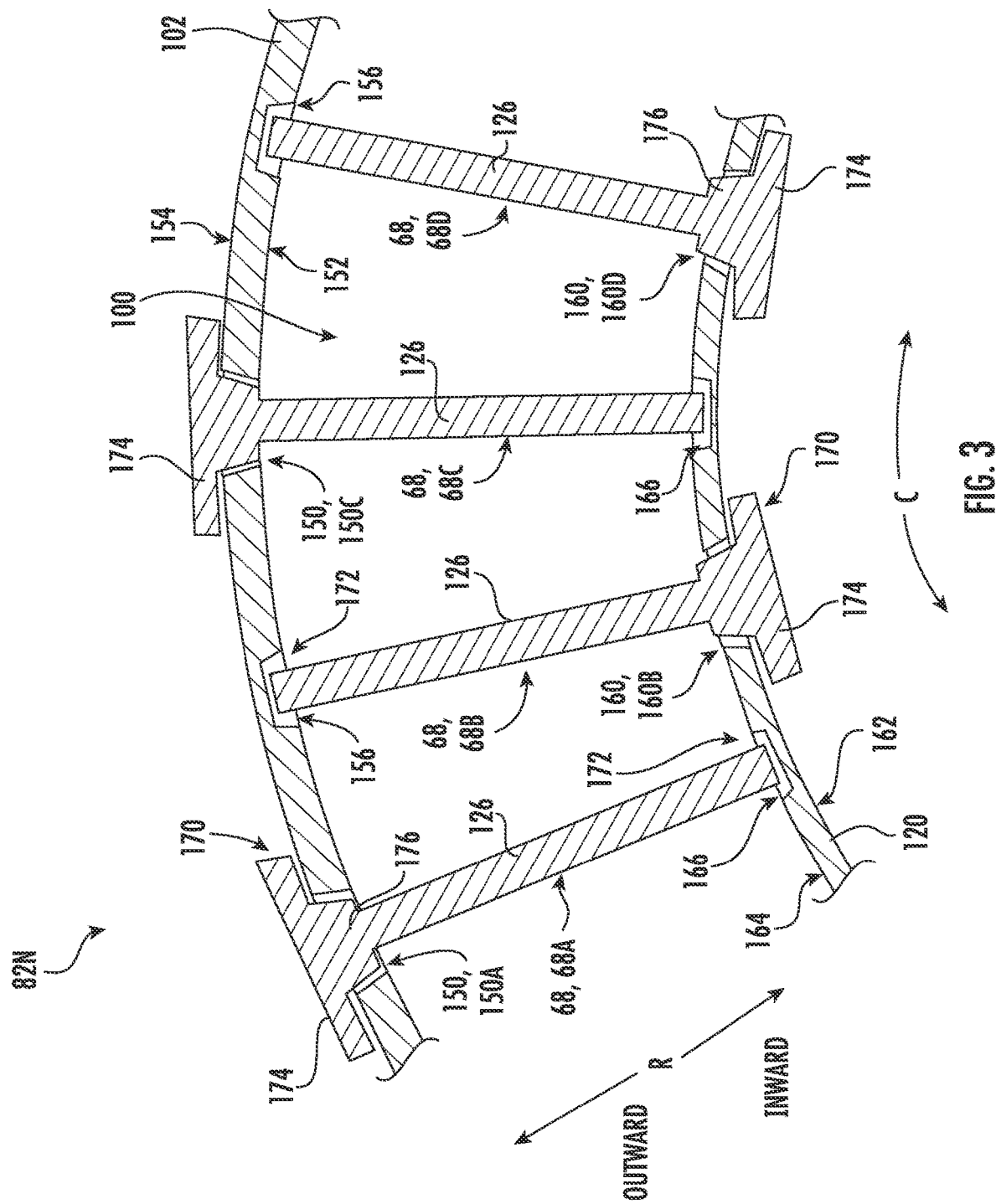
FIG. 3 provides a schematic axial cross-sectional view of a portion of the first stage nozzle assembly of the flow path assembly of FIG. 2.

FIG. 3 provides a schematic axial cross-sectional view of a portion of the first stage nozzle assembly 82N of the flow path assembly 101 of FIG. 2. As shown, the outer wall 102 is spaced outward of the inner wall 120 along the radial direction R. That is, the outer wall 102 is positioned radially outward of the inner wall 120 with respect to the axial centerline 12 (FIG. 2). The outer wall 102 has an inner surface 152 and an outer surface 154 spaced from the inner surface 152 along the radial direction R. The outer wall 102 defines a plurality of mounting openings 150. The mounting openings 150 extend through the radial thickness of the outer wall 102. That is, the mounting openings 150 extend between the inner surface 152 and the outer surface 154 of the outer wall 102 along the radial direction R. Each mounting opening 150 is shaped complementary to a radial cross section of the airfoil 126 of a given vane 68, e.g., so that the airfoil 126 of the vane 68 can be inserted therethrough. The mounting openings 150 are spaced from one another along the circumferential direction C. Particularly, the outer wall 102 defines an array of circumferentially spaced mounting openings 150. The mounting openings 150 defined by the outer wall 102 are generally aligned with one another along the axial direction A for the nozzle assembly 82N. In addition, for this embodiment, the mounting openings 150 are defined by the outer wall 102 along the turbine portion 106 of the outer wall 102.

Figure 6:
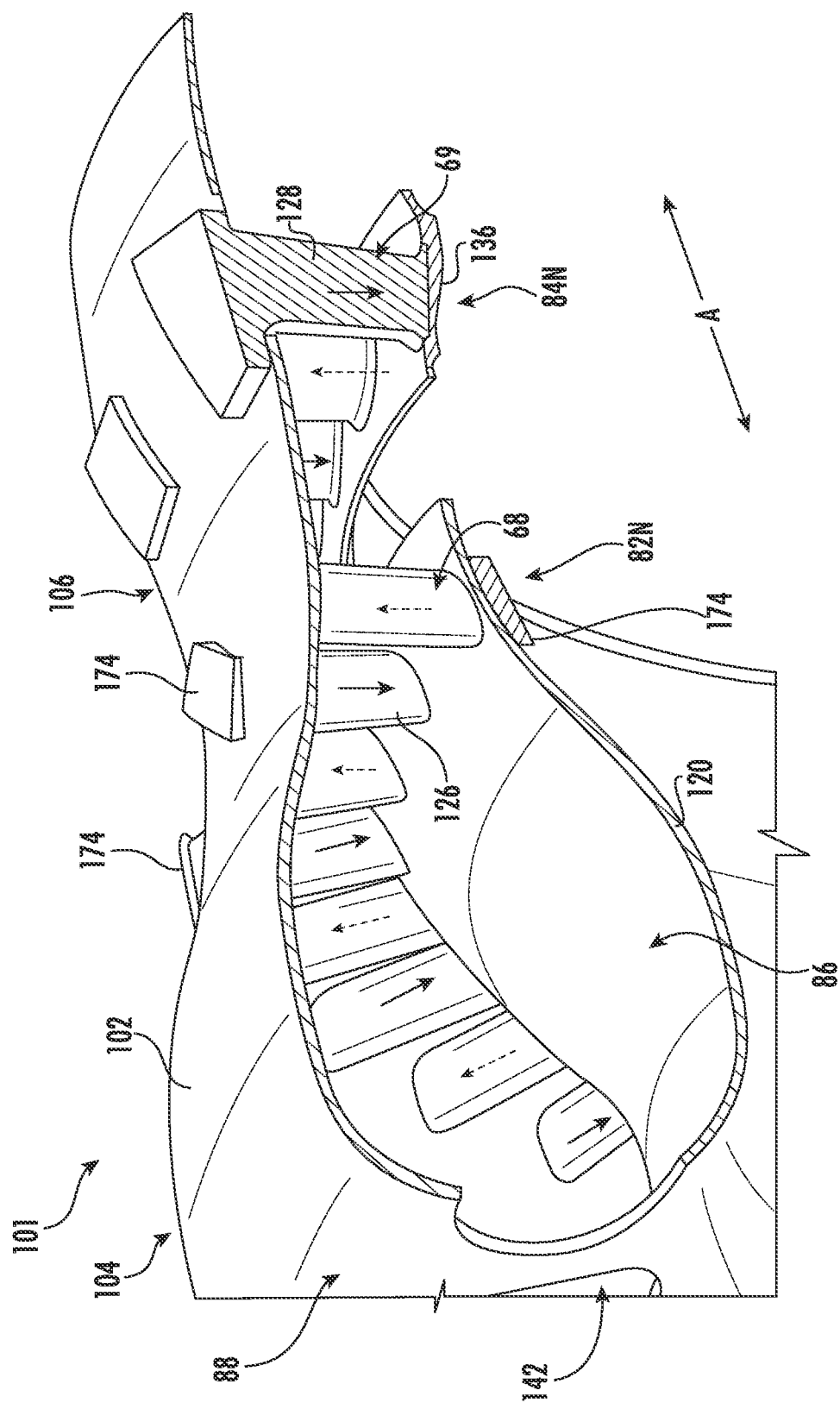
FIG. 6 provides a perspective, cross-sectional view of a portion of an integral outer boundary structure and inner boundary structure of the flow path assembly of FIG. 2.

The inner wall 120 has an inner surface 162 and an outer surface 164 spaced from the inner surface 162 along the radial direction R. Generally, the flow path 100 is defined between the outer surface 164 of the inner wall 120 and the inner surface 152 of the outer wall 102. The inner wall 120 defines a plurality of mounting openings 160. The mounting openings 160 extend through the radial thickness of the inner wall 120. That is, the mounting openings 160 extend between the inner surface 162 and the outer surface 164 of the inner wall 120 along the radial direction R. The mounting openings 160 are spaced from one another along the circumferential direction C. More specifically, the inner wall 120 defines an array of circumferentially spaced mounting openings 160. Each mounting opening 160 is shaped complementary to a radial cross section of the airfoil 126 of a given vane 68, e.g., so that the airfoil 126 of the vane 68 can be inserted therethrough. Moreover, the mounting openings 160 defined by the inner wall 120 are generally aligned with one another along the axial direction A. In addition, the mounting openings 160 of the inner wall 120 and the mounting openings 150 of the outer wall 102 are aligned along the axial direction A. That is, for the nozzle assembly 82N of the first turbine stage 82 depicted in FIG. 3, the mounting openings 160 of the inner wall 120 and the mounting openings 150 of the outer wall 102 are aligned along the axial direction A. Thus, for this embodiment, the mounting openings 160 are defined by the inner wall 120 along the turbine portion 106 (FIG. 2) of the inner wall 120. It will be appreciated that the outer and inner walls 102, 120 can define other arrays of mounting openings along different stages of the turbine section of the turbine engine, e.g., as shown in FIG. 6.

Notably, for this embodiment, each mounting opening 160 of the inner wall 120 is positioned between adjacent mounting openings 150 of the outer wall 102 along the circumferential direction C. Thus, consequently, each mounting opening 150 of the outer wall 102 is positioned between adjacent mounting openings 160 of the inner wall 120 along the circumferential direction C. For instance, as shown in FIG. 3, a first mounting opening 160B of the inner wall 120 is positioned between a first mounting opening 150A of the outer wall 102 and a second mounting opening 150C of the outer wall 102 along the circumferential direction C. This pattern continues annularly around the entirety of the nozzle assembly 82N. Moreover, in some embodiments, the mounting openings 160 of the inner wall 120 are positioned midway between the mounting openings 150 of the outer wall 102 along the circumferential direction C.

As further depicted in FIG. 3, the outer wall 102 defines locating grooves 156 spaced from one another along the circumferential direction C. More specifically, the outer wall 102 defines an array of circumferentially spaced locating grooves 156. The locating grooves 156 defined by the outer wall 102 are generally aligned with one another along the axial direction A for the nozzle assembly 82N. The locating grooves 156 of the outer wall 102 are positioned opposite the mounting openings 160 of the inner wall 120 along the radial direction R. Stated differently, each mounting opening 160 of the inner wall 120 has an associated radially aligned locating groove 156 defined by the outer wall 102. The locating grooves 156 are defined by the outer wall 102 such that they extend radially from the inner surface 152 to a location radially inward of the outer surface 154 of the outer wall 102. Thus, the locating grooves 156 of the outer wall 102 do not extend through the outer wall 102. Each locating groove 156 has radial cross section shaped complementary to and sized to receive a locating end of a nozzle vane inserted through the inner wall 120 as will be explained more fully below.

The inner wall 120 defines locating grooves 166 spaced from one another along the circumferential direction C. Particularly, the inner wall 120 defines an array of circumferentially spaced locating grooves 166. The locating grooves 166 defined by the inner wall 120 are generally aligned with one another along the axial direction A for the nozzle assembly 82N. The locating grooves 166 of the inner wall 120 are positioned opposite the mounting openings 150 of the outer wall 102 along the radial direction R. Stated differently, each mounting opening 150 of the outer wall 102 has an associated radially aligned locating groove 166 defined by the inner wall 120. The locating grooves 166 are defined by the inner wall 120 such that they extend radially from the outer surface 164 to a location radially outward of the inner surface 162 of the inner wall 120. Thus, the locating grooves 166 of the inner wall 120 do not extend through the inner wall 120. Each locating groove 166 has radial cross section shaped complementary to and sized to receive a locating end of a nozzle vane inserted through the outer wall 102 as will be explained more fully below.

The nozzle assembly 82N includes a plurality of vanes 68. Each vane 68 extends between a mounting end 170 and a locating end 172 along the radial direction R. Further, each vane 68 has an airfoil 126 positioned at least in part within the flow path 100, a mounting flange 174 positioned at the mounting end 170 of the vane 68, and a sealing portion 176 connecting the airfoil 126 and the mounting flange 174. For each vane 68, the sealing portion 176 is positioned between the airfoil 126 and the mounting flange 174 along the radial direction R. As shown in FIG. 3, the nozzle assembly 82N includes a plurality of first vanes and a plurality of second vanes. The first vanes are inserted inward through the mounting openings 150 of the outer wall 102 and into the flow path 100 along the radial direction R with respect to the axial centerline 12 and the second vanes are inserted outward through the mounting openings 160 of the inner wall 120 and into the flow path 100 along the radial direction R with respect to the axial centerline 12 in an alternating manner. More particularly, for this embodiment, every other vane 68 positioned along the circumferential direction C is a first vane inserted inward through one of the mounting openings 150 of the outer wall 102 and into the flow path 100 along radial direction R and every other vane 68 positioned along the circumferential direction C is a second vane inserted outward through one of the mounting openings 160 of the inner wall 120 and into the flow path 100 along the radial direction R. Thus, the plurality of first vanes and the plurality of second vanes are arranged in an alternating manner along the circumferential direction C.

For instance, first vanes 68A, 68C and second vanes 68B, 68D are depicted in FIG. 3 arranged in an alternating manner. As shown, the first vane 68A is inserted through the mounting opening 150A of the outer wall 102. When the first vane 68A is fully inserted into position, the mounting flange 174 of the first vane 68A is positioned outward of the outer wall 102 along the radial direction R with respect to the axial centerline 12 (FIG. 2) and the airfoil 126 of the first vane 68A is positioned at least in part within the flow path 100. The second vane 68B is positioned adjacent the first vane 68A along the circumferential direction C and is inserted through the mounting opening 160B of the inner wall 120. When the second vane 68B is fully inserted into position, the mounting flange 174 of the second vane 68B is positioned inward of the inner wall 120 along the radial direction R with respect to the axial centerline 12 (FIG. 2) and the airfoil 126 of the second vane 68B is positioned at least in part within the flow path 100. Continuing with the alternating arrangement, the first vane 68C is positioned adjacent the second vane 68B along the circumferential direction C and is inserted through the mounting opening 150C of the outer wall 102. When the first vane 68C is fully inserted into position, the mounting flange 174 of the first vane 68C is positioned outward of the outer wall 102 along the radial direction R with respect to the axial centerline 12 (FIG. 2) and the airfoil 126 is positioned at least in part within the flow path 100. The second vane 68D is positioned adjacent the first vane 68C along the circumferential direction C is inserted through the mounting opening 160D of the inner wall 120. When the second vane 68D is fully inserted into position, the mounting flange 174 of the second vane 68D is positioned inward of the inner wall 120 along the radial direction R with respect to the axial centerline 12 (FIG. 2) and the airfoil 126 of the second vane 68D is positioned at least in part within the flow path 100.

As shown in FIG. 3, the direction in which the vanes 68A, 68B, 68C, 68D are inserted through their respective mounting openings 150A, 160B, 150C, 160D alternates between an inward and outward direction along the radial direction R. That is, the first vanes 68A, 68C are inserted radially inward with respect to the axial centerline 12 and the second vanes 68B, 68D are inserted radially outward with respect to the axial centerline 12. Moreover, for this embodiment, each of the plurality of vanes 68 extends between the outer wall 102 and the inner wall 120 along the radial direction R. However, none of the vanes 68 extend through both the inner wall 120 and the outer wall 102 in the depicted embodiment of FIG. 3.

Advantageously, alternating the radial insertion direction of the vanes 68 between the outer and inner walls 102, 120 provides more space for fixturing and sealing the vanes 68 in place, e.g., compared to a design in which all blades are inserted radially inward through the outer wall 102. That is, alternating the insertion direction of the vanes provides circumferential space between the mounting flanges 174 of the vanes 68. Consequently, the mounting flanges 174 can be of a larger size without overlapping or contacting one another. Enlarging the size of mounting flanges 174 and/or providing adequate circumferential space therebetween can provide for a more stable nozzle assembly and can prevent unnecessary wear on the vanes and outer and inner walls 102, 120, among other benefits.

Each mounting opening 150, 160 of the outer wall 102 and the inner wall 120 is sized to receive one of the vanes 68 and is shaped complementary to a radial cross section of the vane 68 inserted therethrough. Specifically, the mounting openings 150, 160 are shaped complementary to and are sized to receive the radial cross section of the airfoil 126 of each of the vanes 68. Moreover, the mounting openings 150, 160 are sized and shaped so that the sealing portion 176 of the vanes 68 (and consequently the mounting flanges 174 as well) cannot be inserted therethrough. For instance, as illustrated in FIG. 3, for each vane 68 inserted through one of the mounting openings 150 of the outer wall 102, the sealing portion 176 of each vane 68 wedges the vane 68 into engagement with the outer wall 102. Similarly, for each vane 68 inserted through one of the mounting openings 160 of the inner wall 120, the sealing portion 176 of each vane 68 wedges the vane 68 into engagement with the inner wall 120. The sealing portion 176 of each of the vanes 68 prevents or prohibits fluid leakage to or from the flow path 100. The vanes 68 can be press or interference fit within their respective mounting openings 150, 160 so that the sealing portion 176 of each vane 68 seals the mounting opening 150, 160 around its entire circumference. In some preferred embodiments, the sealing portion 176 of each vane 68 is sized such that the sealing portion 176 is flush or radially aligned with either the inner surface 152 of the outer wall 102 or the outer surface 164 of the inner wall 120 depending on the insertion direction of the particular vane 68.

Figure 4:
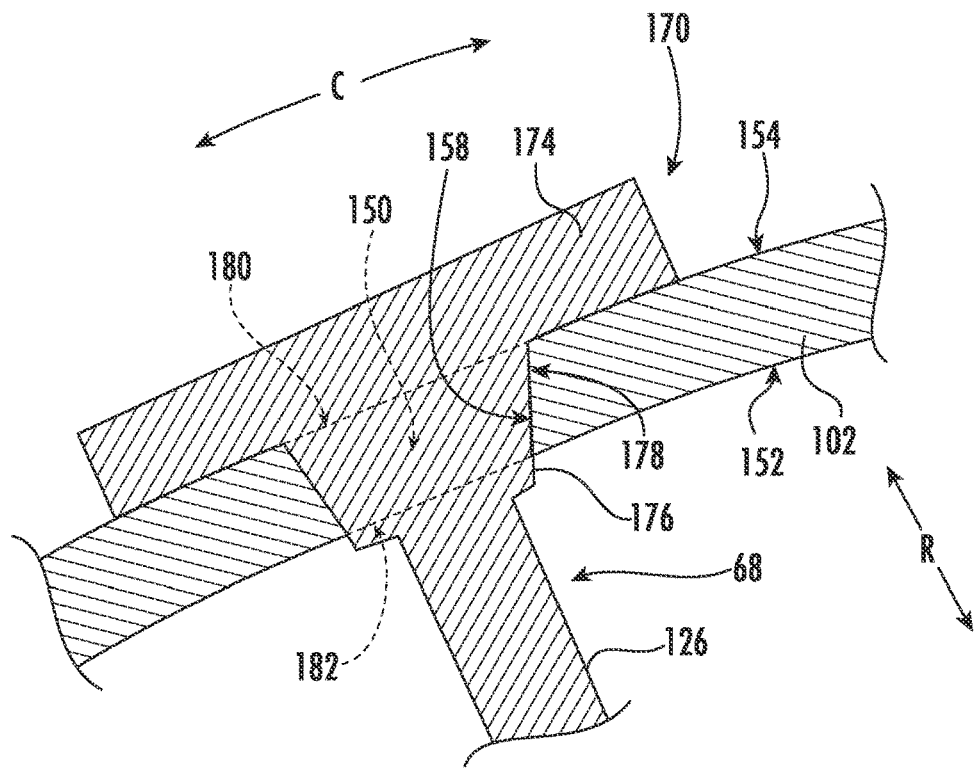
FIG. 4 provides a close-up view of a vane inserted through a mounting opening defined by an outer wall of the first stage nozzle assembly of FIG. 3.
Figure 5:
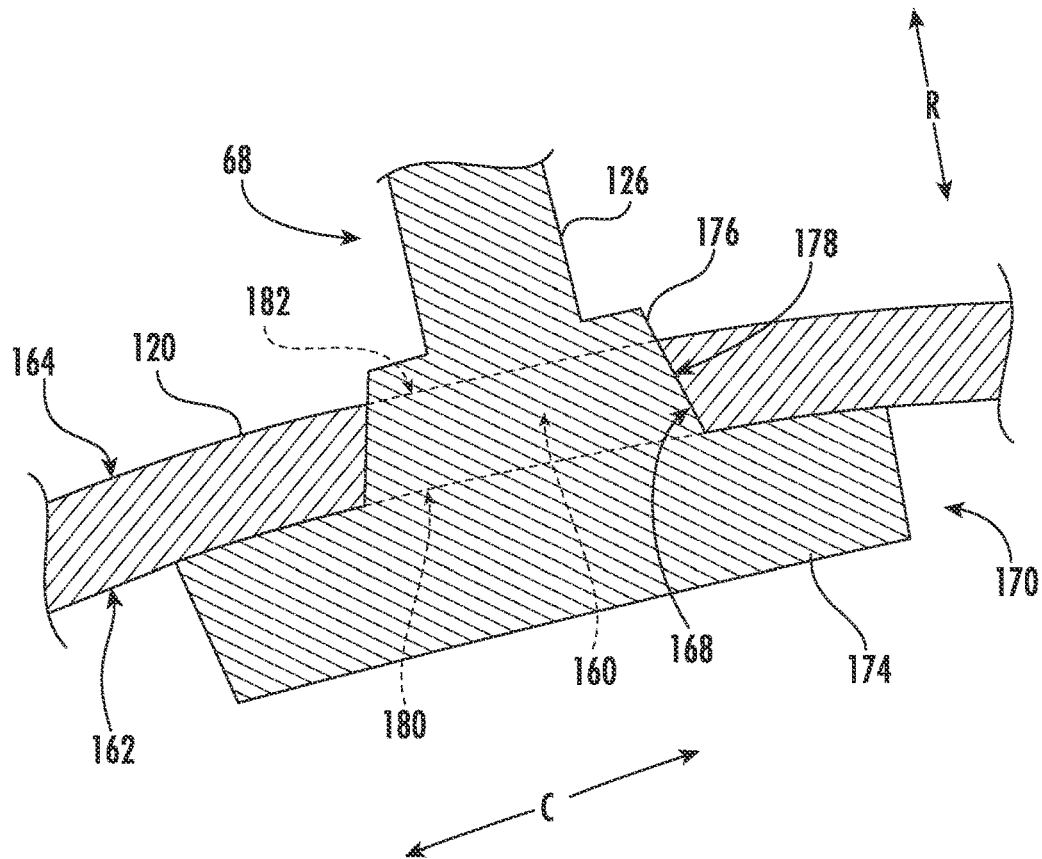
FIG. 5 provides a close-up view of a vane inserted through a mounting opening defined by an inner wall of the first stage nozzle assembly of FIG. 3.

For this embodiment, as shown best in the close-up views of FIGS. 4 and 5, each mounting opening 150, 160 includes an insertion end 180 and a flow path end 182 radially spaced from the insertion end 180. For the mounting openings 150 defined by the outer wall 102, the insertion end 180 of each mounting opening 150 is positioned outward of the flow path end 182 along the radial direction R. For the mounting openings 160 defined by the inner wall 120, the insertion end 180 of each mounting opening 160 is positioned inward of the flow path end 182 along the radial direction R. Further, as shown, each mounting opening 150, 160 is defined in part by a sidewall 158, 168, respectively. Notably, the insertion end 180 of each mounting opening 150, 160 has a larger radial cross-section area than the flow path end 182. Accordingly, the sidewall 158, 168 of each mounting opening 150, 160 is angled with respect to the radial direction R such that the sidewalls 158, 168 converge as they extend toward their respective flow path ends 182 along the radial direction R. Conversely, the sidewall 158, 168 of each mounting opening 150, 160 is angled with respect to the radial direction R such that the sidewalls 158, 168 diverge as they extend toward their respective insertion ends 180 along the radial direction R. The sealing portion 176 of each vane 68 can include one or more angled surfaces 178 that are shaped complementary to the sidewalls 158, 168 of the mounting openings 150, 160. In this way, when the vanes 68 are inserted into their respective mounting openings 150, 160, the mechanical advantage of the complementary angled surfaces wedge the sealing portions 176 into sealing engagement with the sidewalls 158, 168 of the mounting openings 150, 160.

As further shown in FIG. 3, when the vanes 68 are inserted through their respective mounting openings 150, 160, the mounting flanges 174 of the vanes 68 inserted through the mounting openings 150 of the outer wall 102 engage the outer surface 154 of the outer wall 102 and the mounting flanges 174 of the vanes 68 inserted through the mounting openings 160 of the inner wall 120 engage the inner surface 162 of the inner wall 120. Accordingly, the mounting flanges 174 of the vanes 68 provide a stop when the vanes 68 are inserted into their respective mounting openings 150, 160 and prevent the vanes 68 from slipping through their respective mounting openings 150, 160. In some embodiments, the mounting flange 174 of each vane 68 extends a distance that is at least twice the distance from a camber line of the airfoil 126 to a sidewall 158, 168 of the outer or inner wall 102, 120 defining the mounting opening 150, 160 in which the vane 68 is inserted through.

In addition, when the vanes 68 are inserted through their respective mounting openings 150, 160, the mounting end 170 of each vane 68 is positioned in one of the locating grooves 166 of the inner wall 120 or one of the locating grooves 156 of the outer wall 102 depending on the insertion direction of the vane 68. For instance, as shown in FIG. 3, for vanes 68 inserted radially inward through outer wall 102, the mounting end 170 of each vane 68 is positioned in an associated locating groove 166 defined by the inner wall 120. For vanes 68 inserted radially outward through inner wall 120, the mounting end 170 of each vane 68 is positioned in an associated locating groove 156 defined by the outer wall 102. By locating the locating end 172 of each vane 68 in one of the locating grooves 156, 166, the vanes 68 are constrained in position and prevented from moving about during operation of the turbo fan engine 10 (FIG. 1).

FIG. 6 provides a perspective, cross-sectional view of a portion of the flow path assembly 101 of FIG. 2 depicting the outer wall 102 and the inner wall 120 formed as a single piece component. For this embodiment, the outer liner portion 108, outer band portion 110, shroud portion 112, outer band portion 114, shroud portion 116, combustor dome 118, inner liner portion 122, and inner band portion 124 (see FIG. 2) are integrally formed as a single unitary structure. Moreover, as shown in FIG. 6, the vanes 68 inserted inward through the outer wall 102 along the radial direction R (represented by the solid line arrows) alternate along the circumferential direction C with the vanes 68 inserted outward through the inner wall 120 along the radial direction R (represented by the dashed line arrows). Moreover, as shown in FIG. 6, vanes 69 of the nozzle assembly 84N of the second stage can likewise be inserted through the outer and inner walls 102, 120 in an alternating manner. It will be appreciated that FIG. 6 illustrates only a portion of the integral flow path assembly 101 and that, although its entire circumference is not illustrated in FIG. 6, the flow path assembly 101 is a single, unitary piece circumferentially as well as axially. As such, the integral flow path assembly 101 defines a generally annular, i.e., generally ring-shaped, flow path between the outer wall 102 and inner wall 120. In addition, it will be appreciated that the vanes of the nozzle assemblies 82N, 84N can be inserted in an alternating manner annularly around the assembly.

Figure 7:
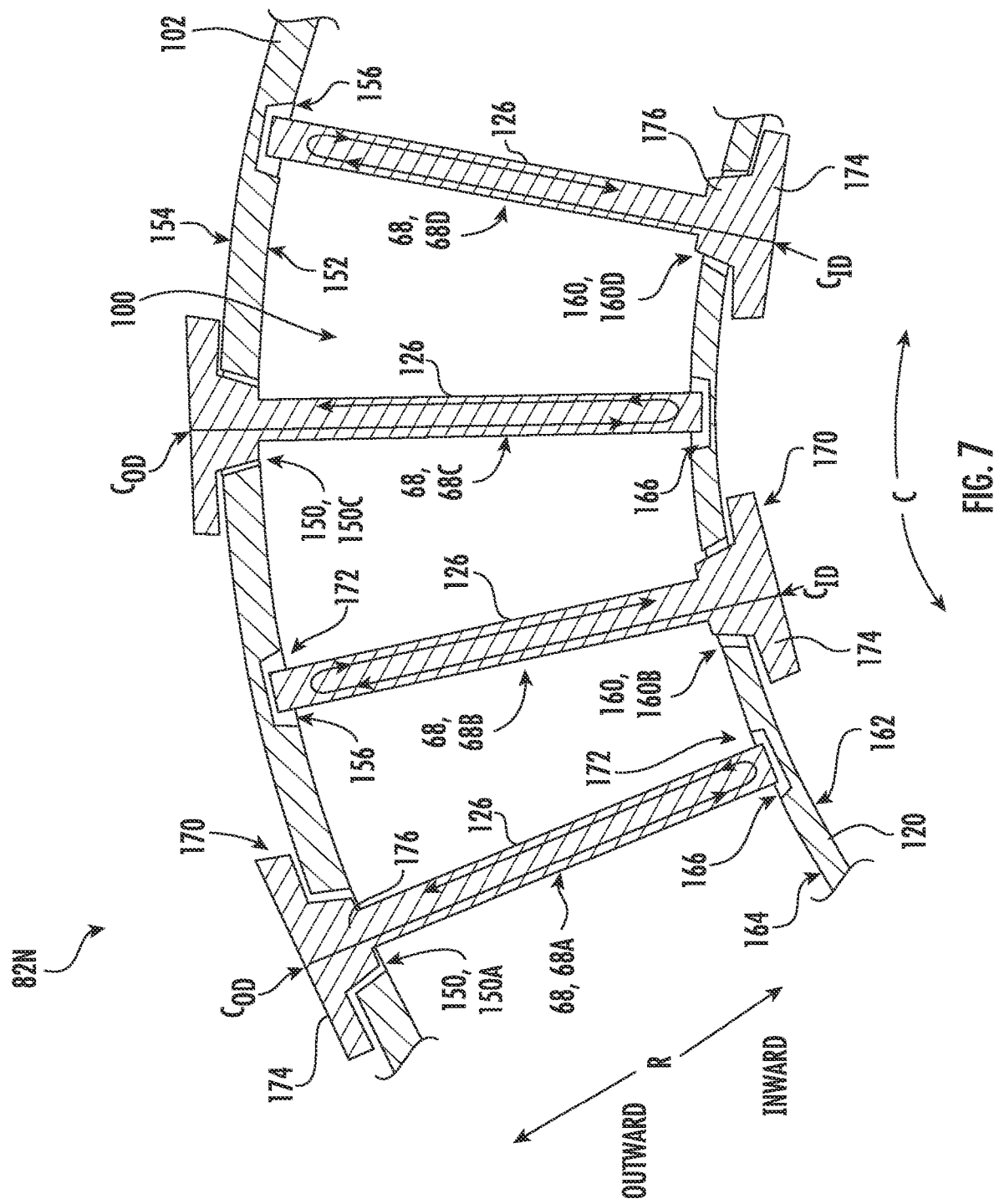
FIG. 7 provides a schematic axial cross-sectional view of a portion of a first stage nozzle assembly of a flow path assembly depicting various cooling features of the assembly according to an example embodiment of the present subject matter.

In some embodiments, vanes of a nozzle assembly can be cooled by a suitable fluid, e.g., by cooling air supplied by a suitable cooling source. For instance, FIG. 7 provides a schematic axial cross-sectional view of a portion of a first stage nozzle assembly of a flow path assembly depicting various cooling features of the assembly. For instance, as depicted in FIG. 7, the nozzle assembly can be the nozzle assembly 82N of FIG. 3. As shown, for this embodiment, cooling fluid is supplied from the outer diameter of the assembly to first vanes 68A, 68C and from the inner diameter of the assembly to second vanes 68B, 68D. Particularly, as shown, cooling fluid $C_{OD}$ is supplied to first vane 68A and to first vane 68C. The cooling fluid $C_{OD}$ can flow through one or more internal passages defined by first vane 68A and the first vane 68C. The mounting flanges 174 and/or outer wall 102 can define one or more metering holes operable to receive the cooling fluid $C_{OD}$. The airfoils 126 of the vanes 68A, 68C can define a plurality of openings such that the cooling fluid $C_{OD}$ can be expelled into the flow path 100. Further, cooling fluid CID is supplied to second vane 68B and to second vane 68D. The cooling fluid CID can flow through one or more internal passages defined by second vane 68B and the second vane 68D. The mounting flanges 174 and/or inner wall 120 can define one or more metering holes operable to receive the cooling fluid CID. The airfoils 126 of the vanes 68B, 68D can define a plurality of openings such that the cooling fluid CID can be expelled into the flow path 100. Notably, for this embodiment, every other vane 68 is supplied coolant from the outer diameter of the assembly and every other vane 68 is supplied coolant from the inside diameter of the assembly.

Although the nozzle assembly 82N of FIG. 7 is depicted as a first stage nozzle assembly, it will be appreciated that nozzle assemblies of other stages can likewise include cooling features, e.g., as described above. For instance, the second stage nozzle assembly 84N of FIGS. 2 and 6 can be cooled in the same or similar manner as the first stage nozzle assembly 82N of FIG. 7. In some example embodiments, for instance, the vanes can each define one or more internal cooling cavities. For at least some of the vanes, the one or more internal cooling cavities can be supplied with a cooling fluid (e.g., compressor discharge air) via a supply plenum positioned at the outer diameter of the nozzle assembly. The cooling fluid can be discharged from the internal cooling cavities via a discharge plenum positioned at the inner diameter. In this way, cooling fluid can flow radially inward through the vanes. All of the vanes can be supplied cooling fluid in a radially inward direction, or alternatively, at least some of the vanes can be cooled by cooling fluid flowing in a radially outward direction. For instance, the one or more internal cooling cavities can be supplied a cooling fluid via a supply plenum positioned at the inner diameter of the nozzle assembly. The cooling fluid can be discharged from the internal cooling cavities via a discharge plenum positioned at the outer diameter. In this way, cooling fluid can flow radially outward through the vanes. In some embodiments, all of the vanes can be supplied cooling fluid in a radially outward direction, or as noted above, the direction in which cooling fluid flows through the internal cooling cavities can alternate depending on the insertion direction of the vanes. In yet some further embodiments, cooling fluid can be supplied through metal tubes extending through the CMC vanes of the nozzle assembly.

Figure 8:
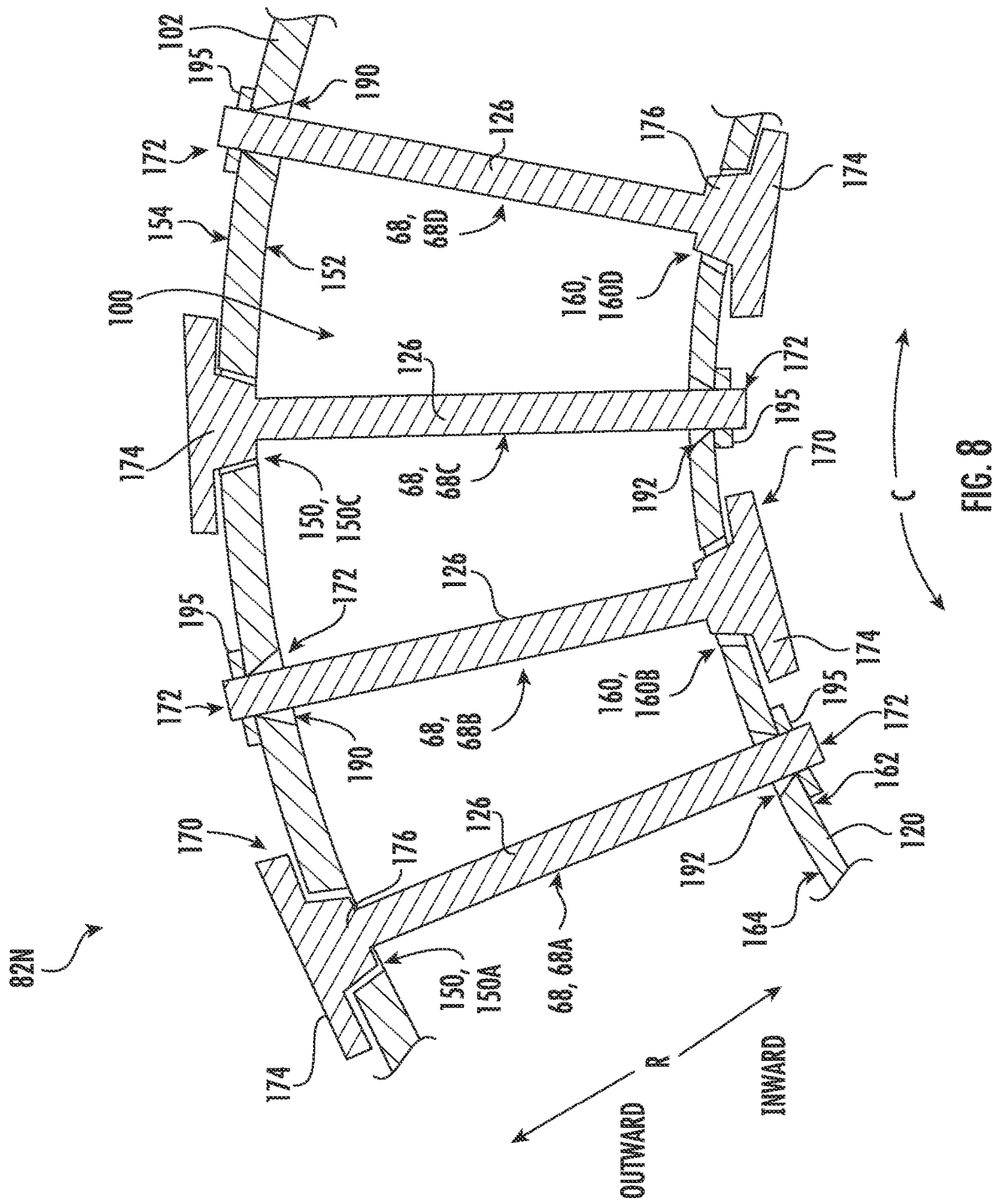
FIG. 8 provides a schematic axial cross-sectional view of a portion of a first stage nozzle assembly of a flow path assembly for a turbine engine according to an example embodiment of the present subject matter.

FIG. 8 provides a schematic axial cross-sectional view of a portion of a first stage nozzle assembly of a flow path assembly for a turbine engine according to an example embodiment of the present subject matter. For the depicted embodiment of FIG. 8, the vanes 68 of the nozzle assembly 82N are inserted radially inward and outward in an alternating manner as described above. However, for this embodiment, the outer wall 102 defines a plurality of through openings 190 instead of locating grooves 156 (FIG. 3). As shown, the through openings 190 are positioned opposite the mounting openings 160 defined by the inner wall 120 along the radial direction R. In addition, the inner wall 120 defines a plurality of through openings 192 instead of locating grooves 166 (FIG. 3). As shown, the through openings 192 are positioned opposite the mounting openings 150 defined by the outer wall 102 along the radial direction R.

As further depicted in FIG. 8, the locating end 172 of each vane 68 is inserted through one of the through openings 190, 192. Particularly, the locating end 172 of the first vane 68A is inserted though the through opening 192 defined by the inner wall 120 such that at least a portion of the first vane 68A is positioned radially inward of the inner wall 120 along the radial direction R with respect to the axial centerline 12 (FIG. 2). The locating end 172 of the second vane 68B is inserted though the through opening 190 defined by the outer wall 102 such that at least a portion of the second vane 68B is positioned radially outward of the outer wall 102 along the radial direction R with respect to the axial centerline 12 (FIG. 2). The locating end 172 of the first vane 68C is inserted though the through opening 192 defined by the inner wall 120 such that at least a portion of the first vane 68C is positioned radially inward of the inner wall 120 along the radial direction R with respect to the axial centerline 12 (FIG. 2). Further, the locating end 172 of the second vane 68D is inserted though the through opening 190 defined by the outer wall 102 such that at least a portion of the second vane 68D is positioned radially outward of the outer wall 102 along the radial direction R with respect to the axial centerline 12 (FIG. 2).

For this embodiment, each vane 68 is retained at its locating end 172 by a retaining feature. Particularly, for the depicted embodiment of FIG. 8, each vane 68 is retained at its locating end 172 by a retention device 195. The retention device 195 can be any suitable mechanical retention device, such as a ring clip, a dowel pin, a nut, etc. As illustrated, the first vane 68A is retained at its locating end 172 by a first retaining feature, or retention device 195. The retention device 195 can secure the locating end 172 relative to the outer wall 102. In some embodiments, a radial space in which no components are positioned can be defined between the retention device 195 and the outer surface 154 of the outer wall 102, e.g., to allow for thermal growth. In yet other embodiments, a bushing or the like can be positioned therebetween to protect the CMC outer wall 102, e.g., from delamination. The first vane 68C is retained by a first retaining feature, or retention device 195 in this example embodiment, in a similar manner as the first vane 68A.

Furthermore, the second vane 68B is retained at its locating end 172 by a second retaining feature, or retention device 195. The retention device 195 can secure the locating end 172 relative to the inner wall 120. In some embodiments, a radial space in which no components are positioned can be defined between the retention device 195 and the inner surface 162 of the inner wall 120, e.g., to allow for thermal growth. In yet other embodiments, a bushing or the like can be positioned therebetween to protect the CMC inner wall 120, e.g., from delamination. The second vane 68D is retained by a second retaining feature, or retention device 195 in this example embodiment, in a similar manner as the second vane 68B.

Figure 9:
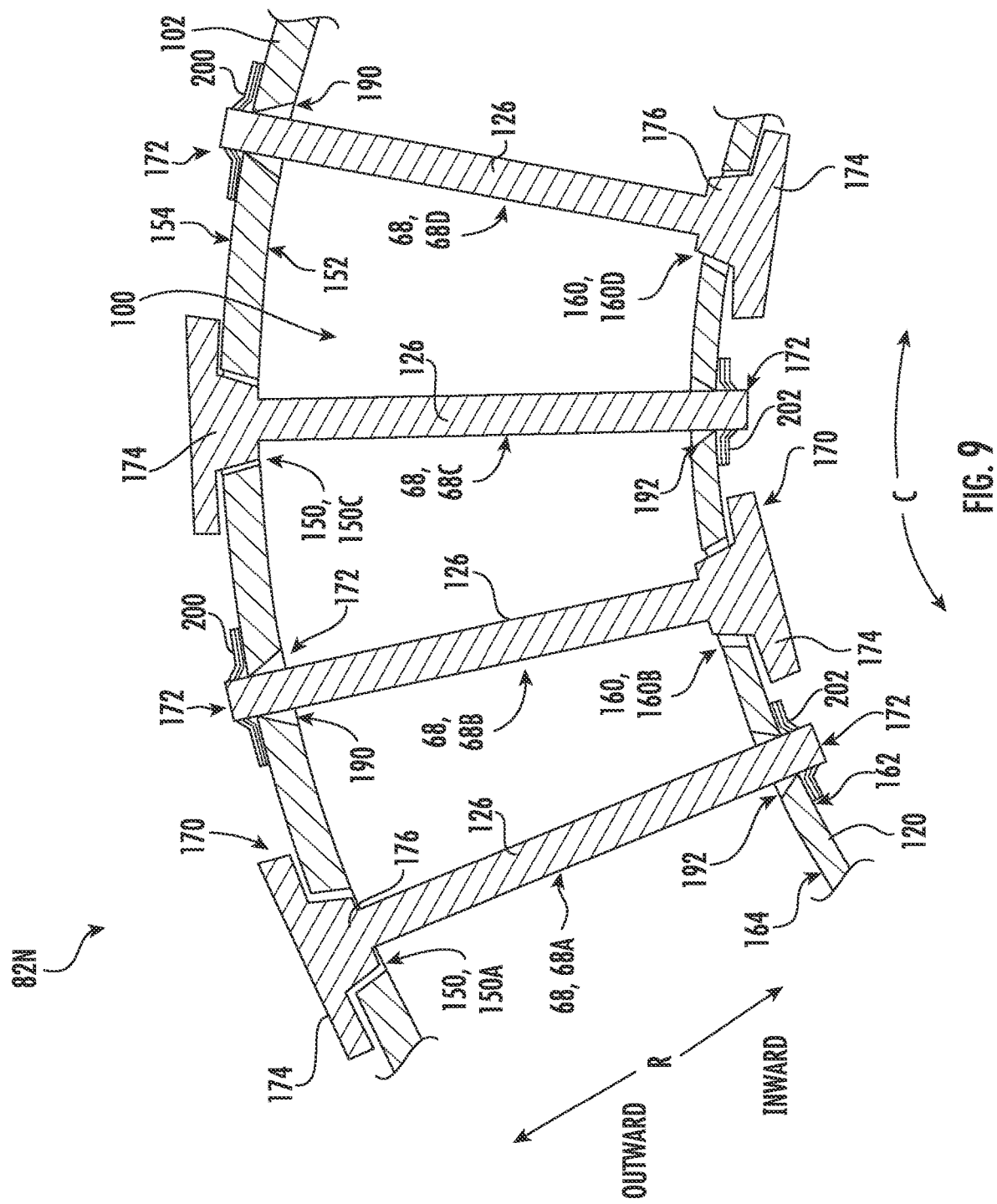
FIG. 9 provides a schematic axial cross-sectional view of a portion of a first stage nozzle assembly of a flow path assembly for a turbine engine according to yet another example embodiment of the present subject matter.

FIG. 9 provides a schematic axial cross-sectional view of a portion of a first stage nozzle assembly of a flow path assembly for a turbine engine according to yet another example embodiment of the present subject matter. For the depicted embodiment of FIG. 9, the vanes 68 of the nozzle assembly 82N are inserted radially inward and outward in an alternating manner as described above. For this embodiment, the outer wall 102 defines a plurality of through openings 190 and the inner wall 120 defines a plurality of through openings 192, e.g., similar to the depicted embodiment of FIG. 8. Moreover, the locating ends 172 of the vanes 68A, 68B, 68C, and 68D are each inserted through their associated through openings 190, 192 as depicted in FIG. 9.

For the depicted embodiment of FIG. 9, each vane 68 is retained at its locating end 172 by a retaining feature, or more specifically, each vane 68 is retained at its locating end 172 by one or more plies laid up and thermally processed as described herein. As illustrated, the first vane 68A is retained at its locating end 172 to the cold side or outer surface 154 of the outer wall 102 by a first retaining feature, or one or more plies 200 in this example embodiment. The plies 200 can secure the locating end 172 to the outer wall 102. The first vane 68C is retained at its locating end 172 to the outer surface 154 of the outer wall 102 by a first retaining feature, or one or more plies 200 in this example embodiment, in a similar manner as the first vane 68A. Furthermore, the second vane 68B is retained at its locating end 172 to the cold side or inner surface 162 of the inner wall 120 by a second retaining feature, or one or more plies 202 in this example embodiment. The plies 202 can secure the locating end 172 to the inner wall 120. The second vane 68D is retained at its locating end 172 to the inner surface 162 of the inner wall 120 by a second retaining feature, or one or more plies 202 in this example embodiment, in a similar manner as the second vane 68B.

Figure 10:
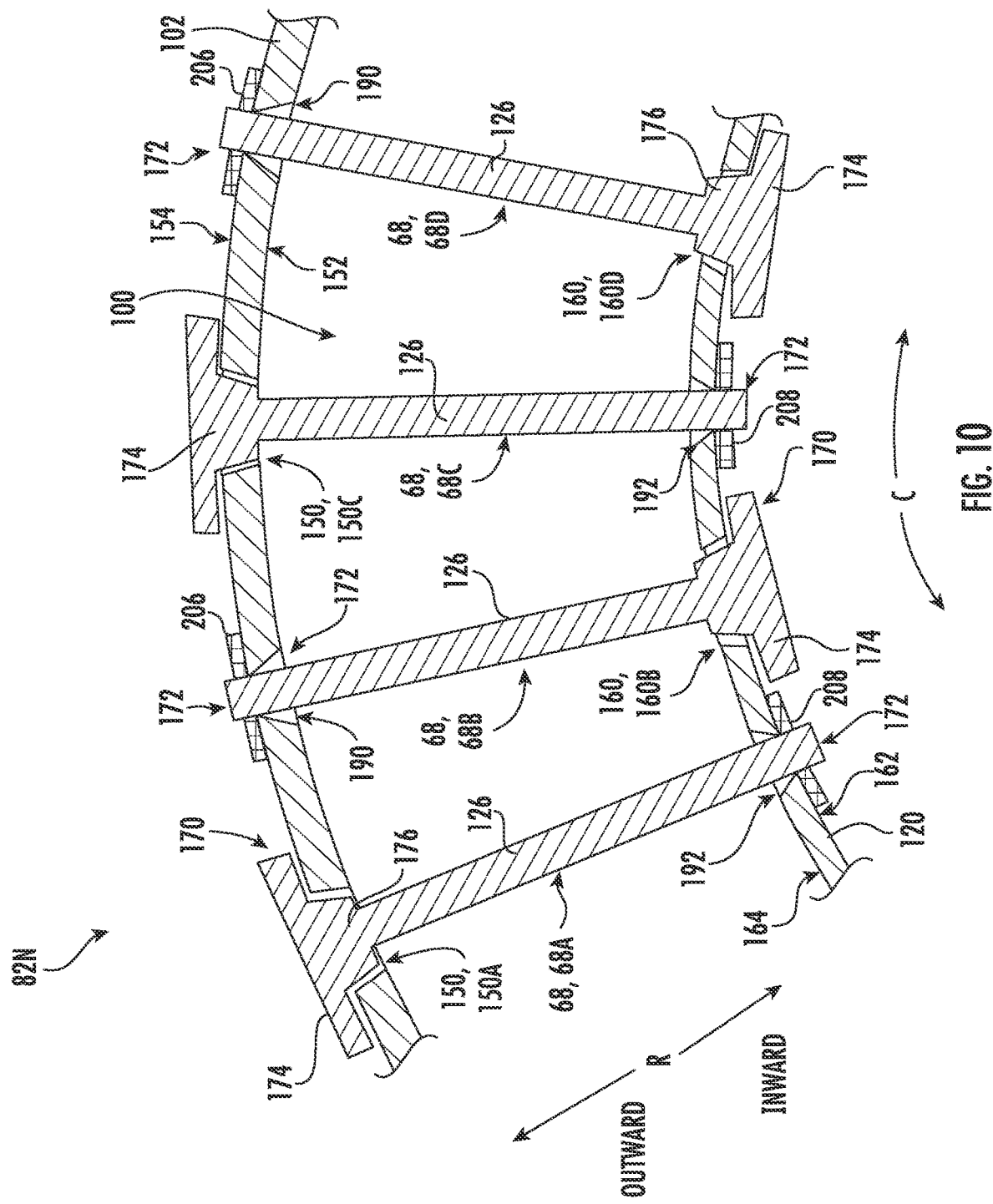
FIG. 10 provides a schematic axial cross-sectional view of a portion of a first stage nozzle assembly of a flow path assembly for a turbine engine according to a further example embodiment of the present subject matter.

FIG. 10 provides a schematic axial cross-sectional view of a portion of a first stage nozzle assembly of a flow path assembly for a turbine engine according to a further example embodiment of the present subject matter. For the depicted embodiment of FIG. 10, the vanes 68 of the nozzle assembly 82N are inserted radially inward and outward in an alternating manner as described above. For this embodiment, the outer wall 102 defines a plurality of through openings 190 and the inner wall 120 defines a plurality of through openings 192, e.g., similar to the depicted embodiments of FIGS. 8 and 9. Moreover, the locating ends 172 of the vanes 68A, 68B, 68C, and 68D are each inserted through their associated through openings 190, 192 as depicted in FIG. 10.

For the depicted embodiment of FIG. 10, each vane 68 is retained at its locating end 172 by a retaining feature, or more specifically, each vane 68 is retained at its locating end 172 by a bonding material. For instance, the bonding material can be a braze-type bonding or other infiltration type bonding material. As illustrated, the first vane 68A is retained at its locating end 172 to the cold side or outer surface 154 of the outer wall 102 by a first retaining feature, or bonding material 206 in this example embodiment. The bonding material 206 can secure the locating end 172 to the outer wall 102. The first vane 68C is retained at its locating end 172 to the outer surface 154 of the outer wall 102 by a first retaining feature, or bonding material 206 in this example embodiment, in a similar manner as the first vane 68A. Furthermore, the second vane 68B is retained at its locating end 172 to the cold side or inner surface 162 of the inner wall 120 by a second retaining feature, or bonding material 208 in this example embodiment. The bonding material 208 can secure the locating end 172 to the inner wall 120. The second vane 68D is retained at its locating end 172 to the inner surface 162 of the inner wall 120 by a second retaining feature, or bonding material 208 in this example embodiment, in a similar manner as the second vane 68B.

Figure 11:
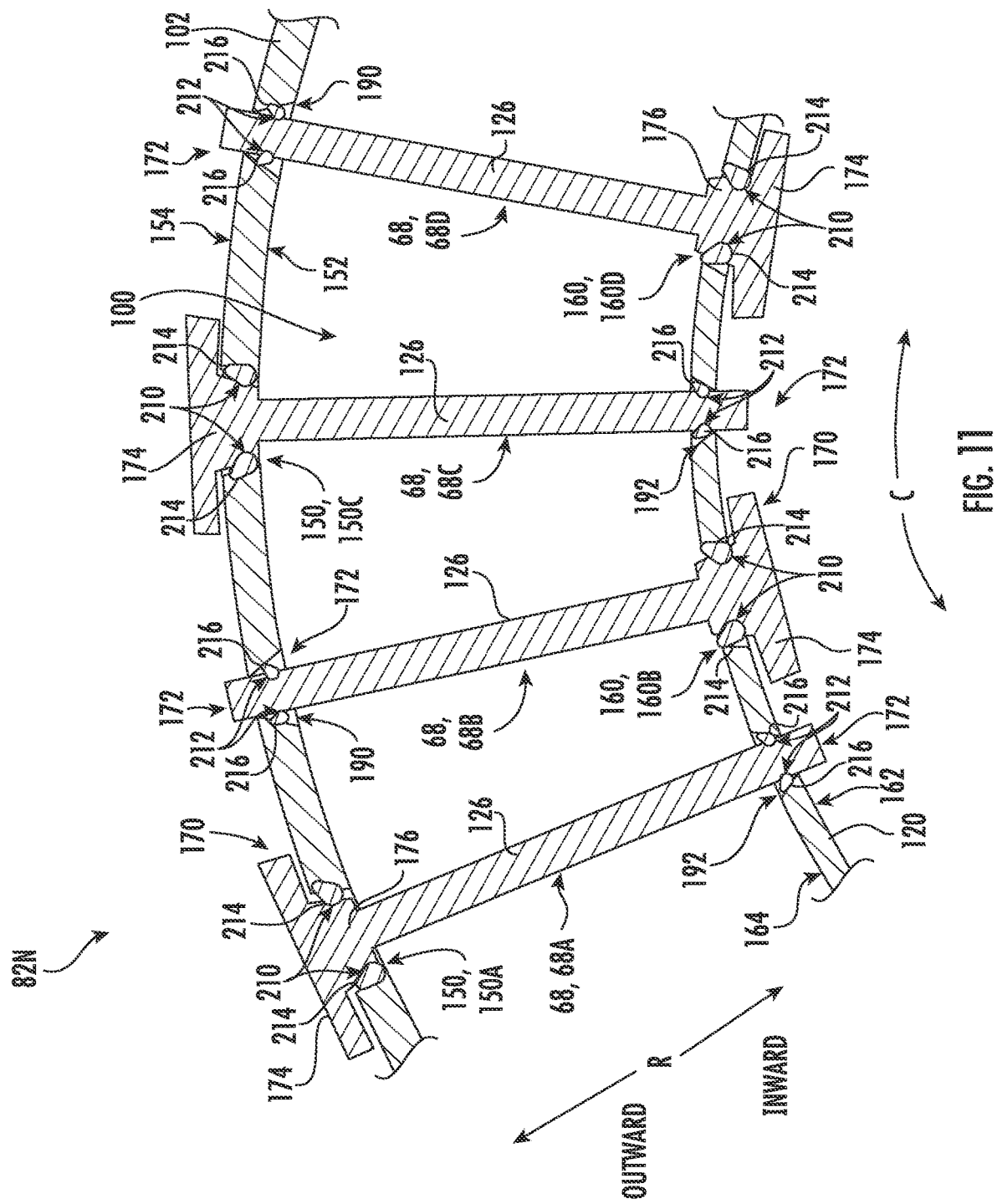
FIG. 11 provides a schematic axial cross-sectional view of a portion of a first stage nozzle assembly of a flow path assembly for a turbine engine according to another further example embodiment of the present subject matter.

FIG. 11 provides a schematic axial cross-sectional view of a portion of a first stage nozzle assembly of a flow path assembly for a turbine engine according to another further example embodiment of the present subject matter. For the depicted embodiment of FIG. 11, the vanes 68 of the nozzle assembly 82N are inserted radially inward and outward in an alternating manner as described above. For this embodiment, the outer wall 102 defines a plurality of through openings 190 and the inner wall 120 defines a plurality of through openings 192, e.g., similar to the depicted embodiments of FIGS. 8, 9, and 10. Moreover, the locating ends 172 of the vanes 68A, 68B, 68C, and 68D are each inserted through their associated through openings 190, 192 as depicted in FIG. 11.

For the depicted embodiment of FIG. 11, each vane 68 can define a mounting end recess 210 at or proximate the mounting end 170. Each vane 68 can also define a locating end recess 212 at or proximate the locating end 172. The mounting end recess 210 of each vane 68 is operable to receive a mounting barbed ring 214 and the locating end recess 212 of each vane 68 is operable to receive a locating barbed ring 216. The rings 214, 216 can be formed of any suitable material capable of being compressed when a vane is inserted into position. For instance, the rings 214, 216 can be formed of a CMC material. When the vanes 68 are inserted into their respective positions, the mounting barbed ring 214 is received within the mounting end recess 210 and is compressed/deformed to form a barbed seal at or proximate the mounting end 170 of the vane. Likewise, the locating barbed ring 216 is received within the locating end recess 212 and is compressed/deformed to form a barbed seal at or proximate the locating end 172. The formed barbed seals reduce or in some instances eliminate flow path 100 leakage. Although a barbed seal is shown formed at the mounting end 170 and locating end 172 of each vane 68 by the engagement of the rings 214, 216 with the vane 68 and respective walls 102, 120, it will be appreciated that in some embodiments that the nozzle assembly 82N can have only locating end barbed seals or mounting end barbed seals formed.

Figure 12:
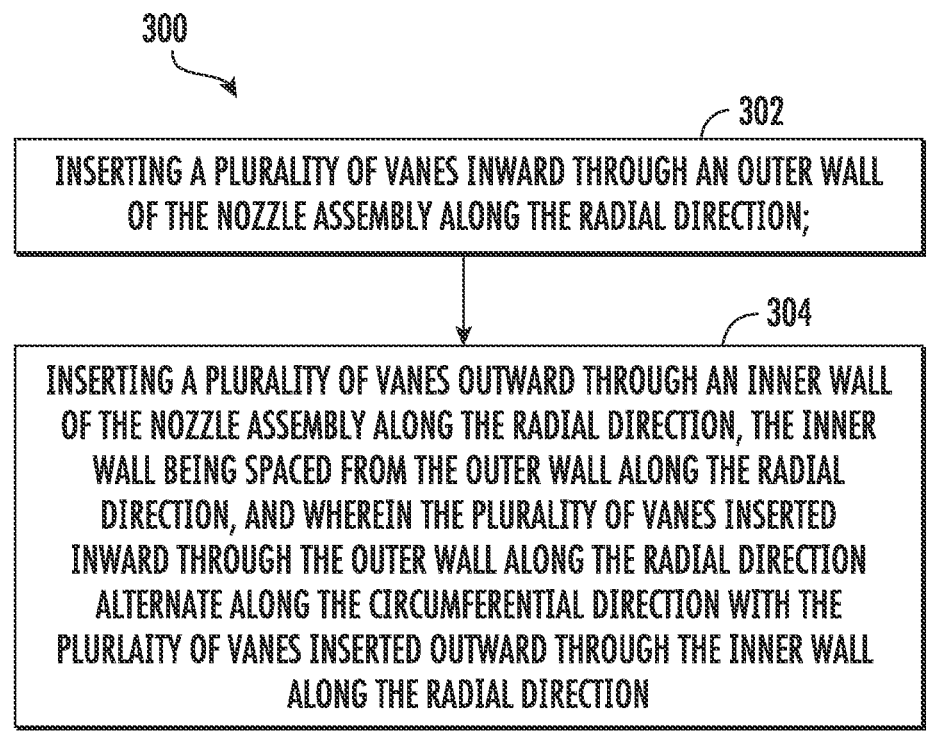
FIG. 12 provides a flow diagram for an example method according to example embodiments of the present subject matter.

FIG. 12 provides a flow diagram of an example method (300) for assembling a nozzle assembly for a turbine engine defining an axial direction, a radial direction, and a circumferential direction according to example embodiments of the present subject matter. For instance, method (300) can be employed to assemble the first turbine stage nozzle assembly 82N and/or the second turbine stage nozzle assembly 84N described herein. Method (300) can also be employed to assembly other nozzle assemblies, such as a nozzle assembly within a compression section of the gas turbine engine or a nozzle assembly within a LP turbine of a gas turbine engine. In addition, FIG. 12 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (302), the method (300) includes inserting a plurality of vanes inward through an outer wall of the nozzle assembly along the radial direction. For instance, the nozzle assembly can be the nozzle assembly 82N, the outer wall can be the outer wall 102, and the vanes can be the vanes 68 of FIG. 3. As shown in FIG. 3, the vanes 68 are inserted radially inward through mounting openings 150 defined by the outer wall 102. The radially inward inserted vanes 68 are inserted such that the vanes 68 extend between the outer wall 102 and the inner wall 120 along the radial direction R and so that the airfoils 126 of the vanes 68 are positioned within the flowpath 100. Moreover, the mounting flanges 174 of each vane 68 remain positioned radially outward of the outer wall 102 and can engage the outer surface 154 of the outer wall 102. The locating ends 172 of the inserted vanes 68 are located and positioned within locating grooves 166 defined by the inner wall 120. Further, the sealing portions 176 of each vane 68 are wedged into position with the outer wall 102 to seal the mounting openings 150 in the outer wall 102.

In some implementations, the outer wall 102 can be a unitary outer wall that is formed as a unitary structure with at least an outer liner portion 108 (FIG. 2) and an outer band portion 110 (FIG. 2). In such implementations, the mounting openings 150 are defined by the outer liner portion 108 of the outer wall 102. In some implementations, the outer wall 102 can simply be an outer band that is separate from the combustion liner and the downstream shroud.

At (304), the method (300) includes inserting a plurality of vanes outward through an inner wall of the flow path assembly along the radial direction. Moreover, in such implementations, the plurality of vanes inserted inward through the outer wall along the radial direction alternate along the circumferential direction with the plurality of vanes inserted outward through the inner wall along the radial direction. For instance, the inner wall can be the inner wall 120, and the vanes can be the vanes 68 of FIG. 3. As shown in FIG. 3, the vanes 68 are inserted radially outward through mounting openings 160 defined by the inner wall 120. The radially outward inserted vanes 68 are inserted such that the vanes 68 extend between the inner wall 120 and the outer wall 102 along the radial direction R and so that the airfoils 126 of the vanes 68 are positioned within the flowpath 100. Moreover, the mounting flanges 174 of each vane 68 remain positioned radially inward of the inner wall 120 and can engage the inner surface 162 of the inner wall 120. The locating ends 172 of the inserted vanes 68 are located and positioned within locating grooves 156 defined by the outer wall 102. Further, the sealing portions 176 of each vane 68 are wedged into position with the inner wall 120 to seal the mounting openings 160 in the inner wall 120. The mounting openings 150, 160 defined by the outer and inner walls 102, 120 can be axially aligned as shown best in FIG. 6.

Notably, as shown in FIG. 3, in some implementations, the plurality of vanes 68 inserted inward through the outer wall 102 along the radial direction R at (302) alternate along the circumferential direction C with the plurality of vanes 68 inserted outward through the inner wall 120 along the radial direction R at (304). That is, for the depicted embodiment of FIG. 3, every other vane 68 around the annulus of the nozzle assembly 82N is inserted radially inward through the outer wall 102 and every other vane 68 around the annulus of the nozzle assembly 82N is inserted radially outward through the inner wall 102. In this way, as noted previously, alternating the radial insertion direction of the vanes 68 between the outer and inner walls 102, 120 provides more space for fixturing and sealing the vanes 68 in place, e.g., compared to a design in which all blades are inserted radially inward through the outer wall 102, among other benefits.

In some implementations, the inner wall 102 can be a unitary structure with the outer wall 102 (e.g., as shown in FIGS. 2 and 6). The inner wall 120 can include at least an inner band portion 124 (FIG. 2). In such implementations, the mounting openings 160 are defined by the inner liner portion 124 of the inner wall 120. In some implementations, the inner wall 120 can simply be an inner band that is separate from the inner combustion liner and the downstream platform.

In some implementations, not all of the vanes of the nozzle assembly alternate between vanes inserted inward and outward, e.g., when there is an odd number of vanes in the nozzle assembly. For instance, a method of assembling a nozzle assembly for a turbine engine defining an axial direction, a radial direction, and a circumferential direction can include inserting a first vane inward through an outer wall of the nozzle assembly along the radial direction and inserting, adjacent the first vane along the circumferential direction, a second vane outward through an inner wall of the nozzle assembly along the radial direction, the inner wall being spaced from the outer wall along the radial direction. In some implementations, the method further includes inserting, adjacent the first vane along the circumferential direction and opposite the second vane, a third vane inward through the outer wall of the nozzle assembly along the radial direction. In this way, the first vane is positioned between the second vane and the third vane along the circumferential direction. The first vane and the third vane are both inserted inward through the outer wall of the nozzle assembly along the radial direction and the second vane is inserted outward through the inner wall of the nozzle assembly along the radial direction.

Figure 13:
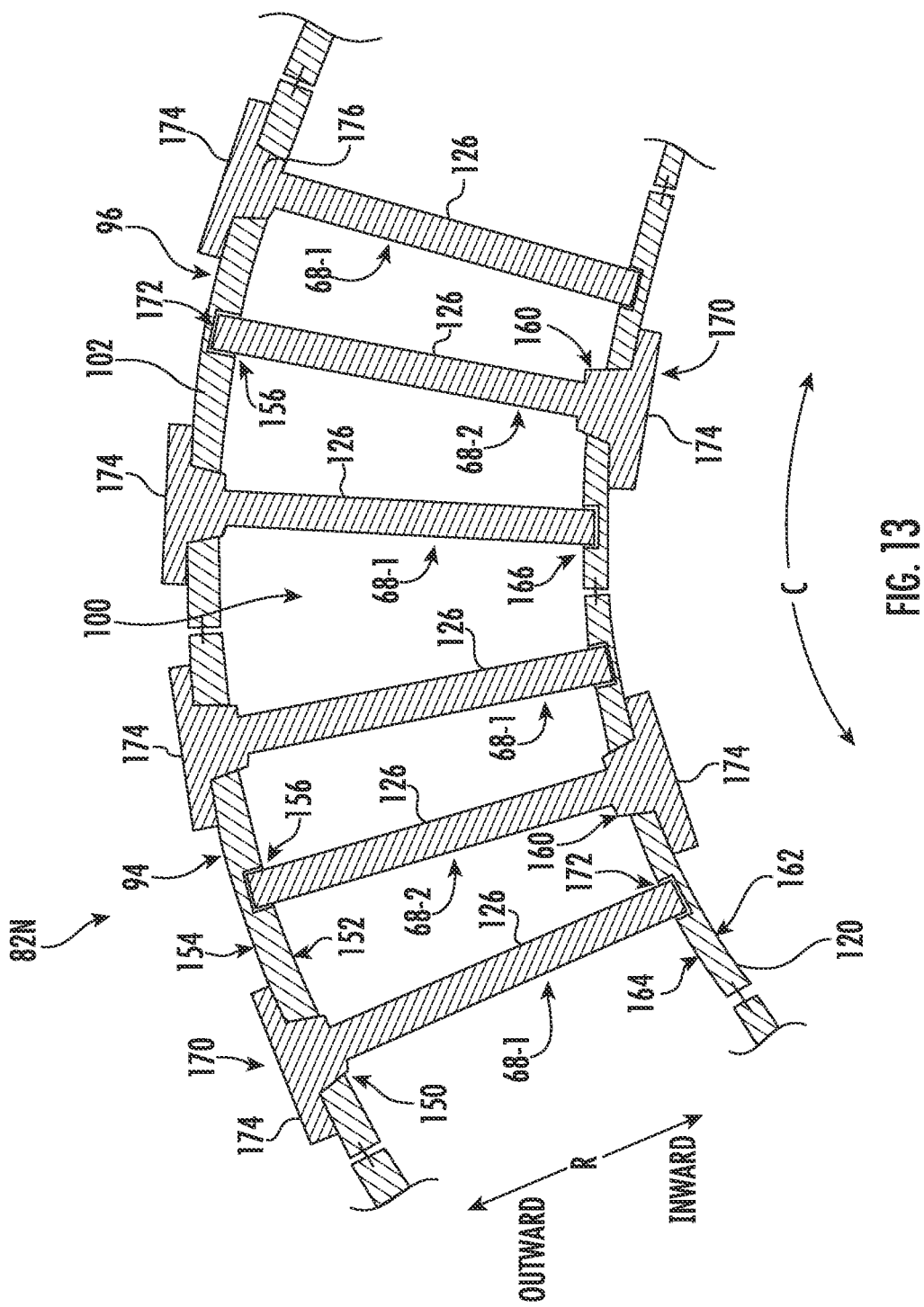
FIG. 13 provides a schematic axial cross-sectional view of a portion of a nozzle assembly according to example embodiments of the present subject matter.

By way of example, FIG. 13 provides a schematic axial cross-sectional view of a portion of a nozzle assembly 82N according to example embodiments of the present subject matter. For this embodiment, the nozzle assembly 82N includes a plurality of triplet segments (two full segments are depicted in FIG. 13) spaced from one another along the circumferential direction C, including a first segment 94 and an adjacent second segment 96. As depicted, both the first segment 94 and the second segment 96 each have three vanes, hence the segments are triplet segments.

For the first segment 94, moving from left to right, a first vane 68-1 is inserted inward through the outer wall 102 of the nozzle assembly 82N along the radial direction R such that the airfoil 126 thereof extends through the mounting opening 150 of the outer wall 102 and is positioned at least in part within the flow path 100. Notably, the mounting flange 174 of the first vane 68-1 is positioned outward of the outer wall 102 along the radial direction R with respect to the axial centerline (e.g., the axial centerline 12 of FIG. 1). Adjacent to the first vane 68-1 along the circumferential direction C (immediately to the right of the first vane 68-1 from the perspective of FIG. 13), a second vane 68-2 is inserted through the inner wall 120 of the nozzle assembly 82N along the radial direction R such that the airfoil 126 thereof extends through the mounting opening 160 of the inner wall 120 and is positioned at least in part within the flow path 100. Notably, the mounting flange 174 of the second vane 68-2 is positioned inward of the inner wall 120 along the radial direction R with respect to the axial centerline (e.g., the axial centerline 12 of FIG. 1). Adjacent to the second vane 68-2 along the circumferential direction C (immediately to the right of the second vane 68-2 of the first segment 94 from the perspective of FIG. 13), another first vane 68-1 (corresponding to the third vane noted above) is inserted inward through the outer wall 102 of the nozzle assembly 82N along the radial direction R such that the airfoil 126 thereof extends through the mounting opening 150 of the outer wall 102 and is positioned at least in part within the flow path 100. As shown, the mounting flange 174 of the first vane 68-1 is positioned outward of the outer wall 102 along the radial direction R with respect to the axial centerline (e.g., the axial centerline 12 of FIG. 1). Accordingly, the vanes of the first segment 94 alternate between first and second vanes.

As further depicted in FIG. 13, the second segment 96 adjacent the first segment 94 has the same vane configuration as the first segment 94. Accordingly, the first vane 68-1 of the first segment 94 (i.e., the first vane 68-1 furthest to the right in FIG. 13) is adjacent a first vane 68-1 of the second segment 96 (i.e., the first vane 68-1 furthest to the left in FIG. 13).

In yet other implementations, a method of assembling a nozzle assembly for a turbine engine defining an axial direction, a radial direction, and a circumferential direction can include inserting a first vane inward through an outer wall of the nozzle assembly along the radial direction and inserting, adjacent the first vane along the circumferential direction, a second vane outward through an inner wall of the nozzle assembly along the radial direction, the inner wall being spaced from the outer wall along the radial direction. The method further includes inserting, adjacent the second vane along the circumferential direction and opposite the first vane, a third vane outward through the inner wall of the nozzle assembly along the radial direction. In this way, the second vane is positioned between the first vane and the third vane along the circumferential direction. The second vane and the third vane are both inserted outward through the inner wall of the nozzle assembly along the radial direction and the first vane is inserted inward through the outer wall of the nozzle assembly along the radial direction. For instance, in such implementations with reference to FIG. 13, the nozzle segment 82N can be configured such that second vanes 68-2 are positioned where the first vanes 68-1 are shown and the first vanes 68-1 are positioned where the second vanes 68-2 are depicted.

Figure 14:
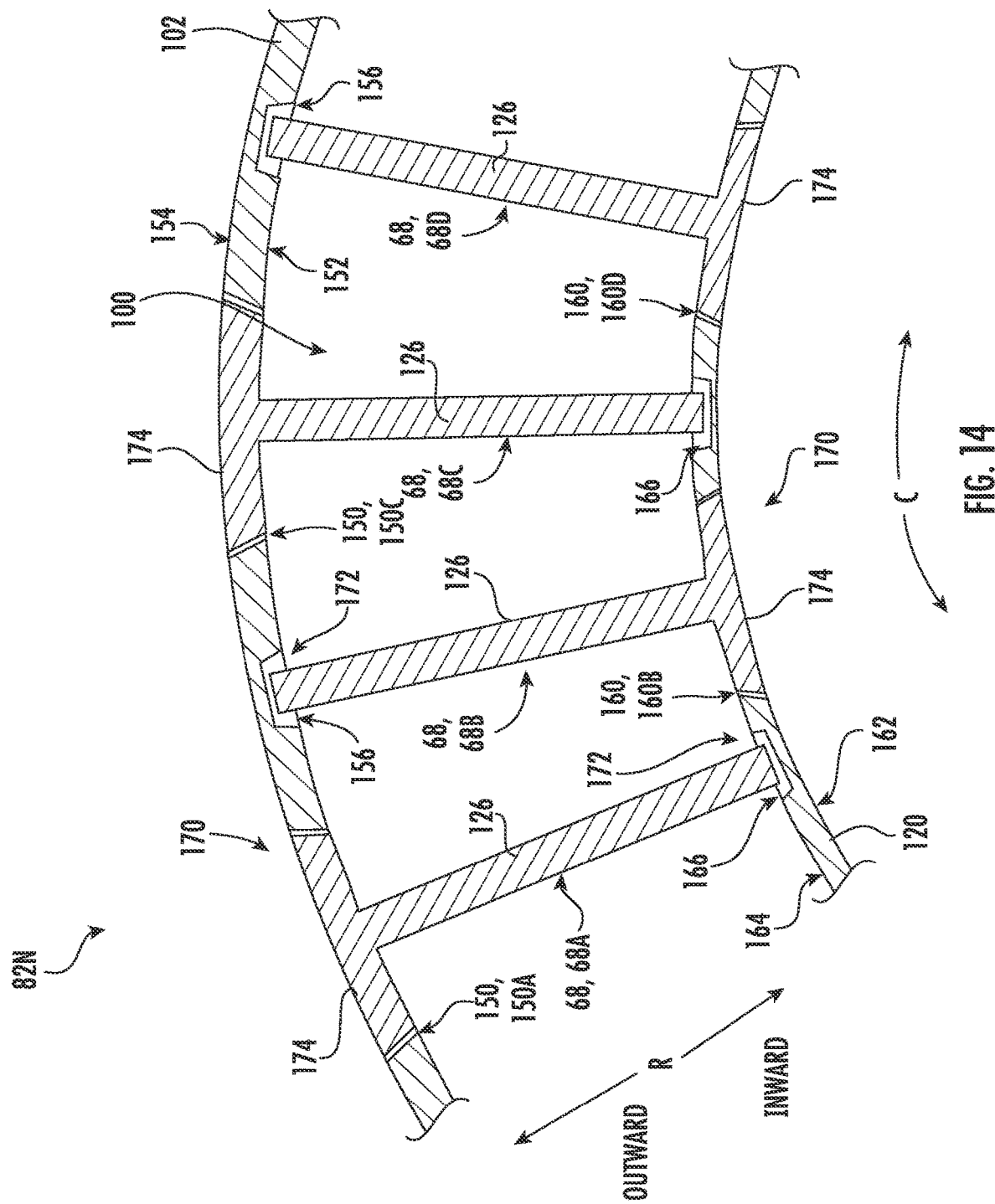
FIG. 14 provides a schematic axial cross-sectional view of a portion of a nozzle assembly for a turbine engine according to example embodiments of the present subject matter.

In some implementations, the mounting flanges of the vanes of the nozzle assembly can be positioned at least in part within their respective mounting openings as shown in FIGS. 14 and 15. Indeed, the mounting flanges of the vanes can wedgingly engage their respective walls.

In some example embodiments, with reference to FIG. 14, a nozzle assembly 82N for a turbine engine is provided. The turbine engine can define an axial direction A (FIG. 2), a radial direction R, a circumferential direction C, and an axial centerline 12 (FIG. 2) extending along the axial direction A. The nozzle assembly 82N includes an outer wall 102 defining a mounting opening 150 and an inner wall 120 defining a mounting opening 160. The outer wall 102 and the inner wall 120 are spaced from one another along the radial direction R. The inner wall 120 and the outer wall 102 define a flow path 100. The nozzle assembly 82N includes a first vane 68A having an airfoil 126 and a mounting flange 174. The airfoil 126 of the first vane 68A is positioned at least in part within the flow path 100 and the mounting flange 174 of the first vane 68A is positioned at least in part within the mounting opening 150 of the outer wall 102, and more specifically mounting opening 150A. The nozzle assembly 82N includes a second vane 68B positioned adjacent the first vane 68A along the circumferential direction C. The second vane 68B has an airfoil 126 and a mounting flange 174. The airfoil 126 of the second vane 68B is positioned at least in part within the flow path 100 and the mounting flange 174 of the second vane 68B is positioned at least in part within the mounting opening 160 of the inner wall 120, and more specifically mounting opening 160B.

In some embodiments, the mounting flange 174 of the first vane 68A is positioned entirely within the mounting opening 150A of the outer wall 102. Further, in some embodiments, the mounting flange 174 of the second vane 68B is positioned entirely within the mounting opening 160B of the inner wall 120. Moreover, in some embodiments, the outer wall 102 has an outer surface 154 and an inner surface 152. The distance between the outer surface 154 and the inner surface 152 defines a radial thickness of the outer wall 102. In such embodiments, the mounting flange 174 of the first vane 68A extends between the outer surface 154 and the inner surface 152 of the outer wall 102 along the radial direction R. Additionally or alternatively, in some embodiments, the inner wall 120 has an outer surface 164 and an inner surface 162. The distance between the outer surface 164 and the inner surface 162 of the inner wall 120 defines a radial thickness of the inner wall 120. In such embodiments, the mounting flange 174 of the second vane 68B extends between the outer surface 164 and the inner surface 162 of the inner wall 120 along the radial direction R.

However, in other embodiments, the mounting flange 174 of the first vane 68A need not extend between the outer surface 154 and the inner surface 152 of the outer wall 102 along the radial direction R and the second vane 68B extends between the outer surface 164 and the inner surface 162 of the inner wall 120 along the radial direction R. For instance, as shown in FIG. 15, the mounting flanges 174 of the first and second vanes 68A, 68B are positioned within their respective mounting openings 150A, 160B and are seated on respective mounting seats 188A, 188b. That is, the mounting flange 174 of the first vane 68A is seated on mounting seat 188A and the mounting flange 174 of the second vane 68B is seated on mounting seat 188B. The seating of the mounting flanges 174 on their respective mounting seats 188A, 188B provides additional retention for the vanes and acts as a positioning aid when the vanes 68A, 68B are inserted through their respective outer and inner walls 102, 120.

As shown in both FIGS. 14 and 15, in some embodiments, sidewalls of the mounting flange 174 of the first vane 68A wedgingly engage the outer wall 102. In some embodiments, sidewalls of the mounting flange 174 of the second vane 68B wedgingly engage the inner wall 120. The wedging of the first vane 68A with the outer wall 102 provides a mechanical advantage in retaining the first vane 68A in position. Likewise, the wedging of the second vane 68B with the inner wall 120 provides a mechanical advantage in retaining the second vane 68B in position.

In some embodiments, with reference to FIG. 14, the outer wall 102 has an outer surface 154 and an inner surface 152 spaced from one another along the radial direction R. The outer wall 102 defines an outer perimeter of the mounting opening 150A at the outer surface 154 and an inner perimeter of the mounting opening 150A at the inner surface 152. As shown in FIG. 14, the outer perimeter is larger than the inner perimeter of the mounting opening 150A of the outer wall 102. Moreover, as shown, the inner wall 120 has an outer surface 164 and an inner surface 162 spaced from one another along the radial direction R. The inner wall 120 defines an outer perimeter of the mounting opening 160B at the outer surface 164 and an inner perimeter of the mounting opening 160B at the inner surface 162. As illustrated, the inner perimeter is larger than the outer perimeter of the mounting opening 160B of the inner wall 120. The geometry of the mounting openings 150A, 160B may facilitate wedging of the mounting flanges with respect to the outer and inner walls 102, 120.

In some embodiments, the mounting opening 150A of the outer wall 102 is one of a plurality of mounting openings 150 of the outer wall 102 and the mounting opening 160A of the inner wall 120 is one of a plurality of mounting openings 160 of the inner wall 120. In such embodiments, the first vane 68A is one of a plurality of first vanes and the second vane 68B is one of a plurality of second vanes. Further, in some embodiments, the airfoil 126 of each first vane of the plurality of first vanes is positioned at least in part within the flow path 100 and the mounting flange 174 of each first vane of the plurality of first vanes is positioned at least in part in one of the plurality of mounting openings 150 of the outer wall 102. In some further embodiments, the airfoil 126 of each second vane of the plurality of second vanes is positioned at least in part within the flow path 100 and the mounting flange 174 of each second vane of the plurality of second vanes is positioned at least in part in one of the plurality of mounting openings 160 of the inner wall 120. In some further embodiments, the plurality of first vanes and the plurality of second vanes are arranged in an alternating manner along the circumferential direction C, e.g., as shown in FIGS. 14 and 15.

In some embodiments, the inner wall 120 defines locating grooves 156 spaced from one another along the circumferential direction C and positioned opposite the mounting openings 150 of the outer wall 102 along the radial direction R and the outer wall 102 defines locating grooves 156 spaced from one another along the circumferential direction C and positioned opposite the mounting openings 160 of the inner wall 120 along the radial direction R. Moreover, in some embodiments, each vane of the plurality of first vanes and the plurality of second vanes has a locating end 172 opposite the mounting flange 174 of the vane, and wherein the locating end 172 of each vane of the plurality of first vanes is received within one of the locating grooves 166 defined by the inner wall 120 and wherein the locating end 172 of each vane of the plurality of second vanes is received within one of the locating grooves 156 defined by the outer wall 102. In some embodiments, the mounting openings 160 of the inner wall 120 are positioned midway or substantially midway between the mounting openings 150 of the outer wall 102 along the circumferential direction C.

In some embodiments, the outer wall 102, the inner wall 120, the first vane 68A, and the second vane 68B can each be formed of a CMC material. The turbine engine in which the nozzle assembly is positioned can be a gas turbine engine, such as an aviation gas turbine engine.

In some example embodiments, a turbine engine is provided. The turbine engine defines an axial direction, a radial direction, a circumferential direction, and an axial centerline extending along the axial direction. The turbine engine includes a combustion section and a turbine section positioned downstream of the combustion section. The turbine engine has an inner wall defining a mounting opening. The turbine engine also has an outer wall that has a combustor portion extending through the combustion section and a turbine portion extending through at least a portion of the turbine section. The combustor portion and the turbine portion are integrally formed as a single unitary structure. The turbine portion of the outer wall defines a mounting opening. The turbine engine also has a first vane having an airfoil and a mounting flange. The mounting flange of the first vane is positioned at least in part in the mounting opening defined by the outer wall. The turbine engine also has a second vane positioned adjacent the first vane along the circumferential direction. The second vane has an airfoil and a mounting flange. The mounting flange of the second vane is positioned at least in part in the mounting opening of the inner wall. In some embodiments, the outer wall, the inner wall, the first vane, and the second vane are formed of a CMC material.

In other embodiments, the inner wall defines a locating groove positioned opposite the mounting opening of the outer wall along the radial direction and the outer wall defines a locating groove positioned opposite the mounting opening of the inner wall along the radial direction. In such embodiments, the first vane and the second vane can each extend between a mounting end and a locating end along the radial direction. The locating end of the first vane is positioned in the locating groove of the inner wall and the locating end of the second vane is positioned in the locating groove of the outer wall. In some embodiments, the mounting opening of the inner wall and the mounting opening of the outer wall are aligned along the axial direction.

A method for assembling a nozzle assembly for a turbine engine defining an axial direction, a radial direction, and a circumferential direction will now be provided. For instance, the nozzle assemblies of FIGS. 14 and 15 can be assembled according to the following exemplary method. The method includes inserting a first vane inward through an outer wall of the nozzle assembly along the radial direction such that a mounting flange of the first vane engages the outer wall and is positioned at least in part within a mounting opening defined by the outer wall. The method also includes inserting, adjacent the first vane along the circumferential direction, a second vane outward through an inner wall spaced from the outer wall along the radial direction such that a mounting flange of the second vane engages the inner wall and is positioned at least in part in a mounting opening defined by the inner wall.

In some implementations, the method further includes inserting, adjacent the first vane and opposite the second vane along the circumferential direction, a third vane inward through the outer wall of the nozzle assembly along the radial direction such that a mounting flange of the third vane engages the outer wall and is positioned at least in part within a second mounting opening defined by the outer wall. In other implementations, the method further includes inserting, adjacent the second vane and opposite the first vane along the circumferential direction, a third vane outward through the inner wall of the nozzle assembly along the radial direction such that a mounting flange of the third vane engages the inner wall and is positioned at least in part in a second mounting opening defined by the inner wall.

In yet other implementations, first vane is one of a plurality of first vanes and the second vane is one of a plurality of second vanes, and wherein the method further comprises: inserting the plurality of first vanes inward through the outer wall of the nozzle assembly along the radial direction such that a mounting flange of each of the plurality of first vanes engage the outer wall and are positioned at least in part within respective mounting openings defined by the outer wall; and inserting the plurality of second vanes outward through the inner wall of the nozzle assembly along the radial direction such that a mounting flange of each of the plurality of second vanes engage the inner wall and are positioned at least in part within respective mounting openings defined by the inner wall. In some implementations, the plurality of first vanes inserted inward through the outer wall along the radial direction alternate along the circumferential direction with the plurality of second vanes inserted outward through the inner wall along the radial direction.

In some implementations, the plurality of vanes inserted inward through the outer wall along the radial direction extend between the outer wall and the inner wall along the radial direction and the plurality of vanes inserted outward through the inner wall along the radial direction extend between the outer wall and the inner wall along the radial direction.

In some further implementations, each of the plurality of vanes inserted inward through the outer wall of the nozzle assembly along the radial direction extends between a locating end and a mounting end, and wherein the locating end of each vane inserted inward through the outer wall of the nozzle assembly along the radial direction is located in one of a plurality of locating grooves defined by the inner wall, and wherein each of the plurality of vanes inserted outward through the inner wall of the nozzle assembly along the radial direction extends between a locating end and a mounting end, and wherein the locating end of each vane inserted outward through the inner wall of the nozzle assembly along the radial direction is located in one of a plurality of locating grooves defined by the outer wall.

In some implementations, each vane of the plurality of vanes inserted inward through the outer wall of the nozzle assembly along the radial direction is wedged into a mounting opening defined by the outer wall. In other implementations, each vane of the plurality of vanes inserted outward through the inner wall of the nozzle assembly along the radial direction is wedged into a mounting opening defined by the inner wall.

Notably, the embodiments disclosed in FIGS. 14 and 15 can include at least some of the features disclosed in one or more of the embodiments disclosed in FIG. 7, FIG. 8, FIG. 9, FIG. 10, FIG. 11, and FIG. 13.

As previously stated, the outer wall 102, inner wall 120, and combustor dome 118, and in some embodiments, the vanes 68, 69 are formed of a CMC material. Examples of CMC materials, and particularly SiC/Si—SiC (fiber/matrix) continuous fiber-reinforced ceramic composite (CFCC) materials and processes, are described in U.S. Pat. Nos. 5,015,540; 5,330,854; 5,336,350; 5,628,938; 6,024,898; 6,258,737; 6,403,158; and 6,503,441, and U.S. Patent Application Publication No. 2004/0067316. Such processes generally entail the fabrication of CMCs using multiple pre-impregnated (prepreg) layers, e.g., the ply material may include prepreg material consisting of ceramic fibers, woven or braided ceramic fiber cloth, or stacked ceramic fiber tows that has been impregnated with matrix material. In some embodiments, each prepreg layer is in the form of a "tape" comprising the desired ceramic fiber reinforcement material, one or more precursors of the CMC matrix material, and organic resin binders. Prepreg tapes can be formed by impregnating the reinforcement material with a slurry that contains the ceramic precursor(s) and binders. Preferred materials for the precursor will depend on the particular composition desired for the ceramic matrix of the CMC component, for example, SiC powder and/or one or more carbon-containing materials if the desired matrix material is SiC. Notable carbon-containing materials include carbon black, phenolic resins, and furanic resins, including furfuryl alcohol ($C_4H_3OCH_2OH$). Other typical slurry ingredients include organic binders (for example, polyvinyl butyral (PVB)) that promote the flexibility of prepreg tapes, and solvents for the binders (for example, toluene and/or methyl isobutyl ketone (MIBK)) that promote the fluidity of the slurry to enable impregnation of the fiber reinforcement material. The slurry may further contain one or more particulate fillers intended to be present in the ceramic matrix of the CMC component, for example, silicon and/or SiC powders in the case of a Si—SiC matrix. Chopped fibers or whiskers or other materials also may be embedded within the matrix as previously described. Other compositions and processes for producing composite articles, and more specifically, other slurry and prepreg tape compositions, may be used as well, such as the processes and compositions described in U.S. Patent Application Publication No. 2013/0157037.

The resulting prepreg tape may be laid-up with other tapes, such that a CMC component formed from the tape comprises multiple laminae, each lamina derived from an individual prepreg tape. Each lamina contains a ceramic fiber reinforcement material encased in a ceramic matrix formed, wholly or in part, by conversion of a ceramic matrix precursor, e.g., during firing and densification cycles as described more fully below. In some embodiments, the reinforcement material is in the form of unidirectional arrays of tows, each tow containing continuous fibers or filaments. Alternatives to unidirectional arrays of tows may be used as well. Further, suitable fiber diameters, tow diameters, and center-to-center tow spacing will depend on the particular application, the thicknesses of the particular lamina and the tape from which it was formed, and other factors. As described above, other prepreg materials or non-prepreg materials may be used as well.

After laying up the tapes or plies to form a layup, the layup is debulked and, if appropriate, cured while subjected to elevated pressures and temperatures to produce a preform. The preform is then heated (fired) in a vacuum or inert atmosphere to decompose the binders, remove the solvents, and convert the precursor to the desired ceramic matrix material. Due to decomposition of the binders, the result is a porous CMC body that may undergo densification, e.g., melt infiltration (MI), to fill the porosity and yield the CMC component. Specific processing techniques and parameters for the above process will depend on the particular composition of the materials. For example, silicon CMC components may be formed from fibrous material that is infiltrated with molten silicon, e.g., through a process typically referred to as the Silcomp process. Another technique of manufacturing CMC components is the method known as the slurry cast melt infiltration (MI) process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

Other techniques for forming CMC components include polymer infiltration and pyrolysis (PIP) and oxide/oxide processes. In PIP processes, silicon carbide fiber preforms are infiltrated with a preceramic polymer, such as polysilazane and then heat treated to form a SiC matrix. In oxide/oxide processing, aluminum or alumino-silicate fibers may be pre-impregnated and then laminated into a preselected geometry. Components may also be fabricated from a carbon fiber reinforced silicon carbide matrix (C/SiC) CMC. The C/SiC processing includes a carbon fibrous preform laid up on a tool in the preselected geometry. As utilized in the slurry cast method for SiC/SiC, the tool is made up of graphite material. The fibrous preform is supported by the tooling during a chemical vapor infiltration process at about 1200° C., whereby the C/SiC CMC component is formed. In still other embodiments, 2D, 2.5D, and/or 3D preforms may be utilized in MI, CVI, PIP, or other processes. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, may be used as well.

Thus, a variety of processes may be used to form a unitary structure, such as the outer wall 102, as a unitary CMC component. More specifically, a plurality of plies of a CMC material may be used to form each unitary structure. The plurality of plies may be interspersed with one another to integrate the various portions forming the unitary structure. As an example, the unitary outer wall 102 can be made from a plurality of outer liner plies, a plurality of first turbine stage outer band plies, a plurality of first turbine stage outer band shroud plies, a plurality of second turbine stage outer band plies, and a plurality of second turbine stage shroud plies. Where the outer liner plies meet the first turbine stage outer band plies, ends of the outer liner plies may be alternated with ends of the outer band plies to integrate the plies for forming the outer liner portion with the plies for forming the first turbine stage outer band portion of the unitary outer wall 102. That is, any joints between the plies forming unitary outer wall 102 may be formed by alternating plies on one side of the joint with plies on the other side of the joint. In other embodiments, the CMC plies may be laid up in other ways as well to form the unitary structure. In addition, laying up the plurality of CMC plies may include defining features of the unitary structure or other components (e.g., inner liner portion 122 when not integrated with inner band portion 124 to from a unitary inner wall 120 or separate combustor dome 118), such as openings 142 in combustor forward end 88.

After the plurality of CMC plies are laid up to define a unitary CMC component preform, the preform is cured to produce a single piece, unitary CMC component, which is then fired and subjected to densification, e.g., silicon melt-infiltration, to form a final unitary CMC structure. Continuing with the above outer wall 102 example, the outer wall preform may be processed in an autoclave to produce a green state unitary outer wall 102. Then, the green state unitary outer wall 102 may be placed in a furnace to burn out excess binders or the like and then placed in a furnace with a piece or slab of silicon and fired to melt infiltrate the unitary outer wall 102 with at least silicon. More particularly, for unitary outer wall 102 formed from CMC plies of prepreg tapes that are produced as described above, heating (i.e., firing) the green state component in a vacuum or inert atmosphere decomposes the binders, removes the solvents, and converts the precursor to the desired ceramic matrix material. The decomposition of the binders results in a porous CMC body; the body may undergo densification, e.g., melt infiltration (MI), to fill the porosity. In the foregoing example where the green state unitary outer wall 102 is fired with silicon, the outer wall 102 undergoes silicon melt-infiltration. However, densification may be performed using any known densification technique including, but not limited to, Silcomp, melt infiltration (MI), chemical vapor infiltration (CVI), polymer infiltration and pyrolysis (PIP), and oxide/oxide processes, and with any suitable materials including but not limited to silicon. In one embodiment, densification and firing may be conducted in a vacuum furnace or an inert atmosphere having an established atmosphere at temperatures above 1200° C. to allow silicon or other appropriate material or combination of materials to melt-infiltrate into the component. The densified CMC body hardens to a final unitary CMC outer wall 102. In some embodiments, optionally, the final unitary structure may be finish machined, e.g., to bring the structure within tolerance or to define openings 142 in forward end 88, and/or an environmental barrier coating (EBC) may be applied to the unitary structure, e.g., to protect the unitary structure from the hot combustion gases 66. It will be appreciated that other methods or processes of forming CMC components, such as unitary CMC outer wall 102, unitary CMC inner wall 120, or the like may be used as well.

Additionally or alternatively, other processes for producing unitary components may be used to form unitary outer wall 102 and/or unitary inner wall 120, and the unitary structure(s) may be formed from other materials. In some embodiments, an additive manufacturing process may be used to form unitary outer wall 102 and/or unitary inner wall 120. For example, an additive process such as Fused Deposition Modeling (FDM), Selective Laser Sintering (SLS), Stereolithography (SLA), Digital Light Processing (DLP), Direct Metal Laser Sintering (DMLS), Laser Net Shape Manufacturing (LNSM), electron beam sintering or other known process may be used to produce a unitary outer wall 102 and/or a unitary inner wall 120. Generally, an additive process fabricates components using three-dimensional information, for example, a three-dimensional computer model, of the component. The three-dimensional information is converted into a plurality of slices, each slice defining a cross section of the component for a predetermined height of the slice. The component is then "built-up" slice by slice, or layer by layer, until finished. Superalloy metallic materials or other suitable materials may be used in an additive process to form unitary outer wall 102 and/or a unitary inner wall 120. In other embodiments, a unitary outer wall 102 and/or unitary inner wall 120 may be formed using a forging or casting process. Other suitable processes or methods may be used as well.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A nozzle assembly for a turbine engine, comprising:
a first wall defining a first mounting opening;
a second wall spaced from the first wall, the first wall and the second wall defining a flow path, the second wall defining a second mounting opening;
a first vane positioned at least in part within the flow path and at least in part within the first mounting opening, the first vane having a first mounting flange that is larger than the first mounting opening to secure the first vane to the first wall, the first vane also having a first retaining feature securing the first vane to the second wall; and
a second vane positioned at least in part within the flow path and at least in part within the second mounting opening, the second vane having a second mounting flange that is larger than the second mounting opening to secure the second vane to the second wall, the second vane having a second retaining feature securing the second vane to the first wall.

2. The nozzle assembly of claim 1, wherein the first wall is spaced from the second wall along a radial direction defined by a turbine engine, and wherein the first wall is positioned inward of the second wall along the radial direction with respect to an axial centerline of the turbine engine.

3. The nozzle assembly of claim 1, wherein the first wall is spaced from the second wall along a radial direction defined by a turbine engine, and wherein the first wall is positioned outward of the second wall along the radial direction with respect to an axial centerline of the turbine engine.

4. The nozzle assembly of claim 1, wherein the second wall defines a through opening through which the first vane extends, the first vane being secured by the first retaining feature outside of the flow path.

5. The nozzle assembly of claim 1, wherein the second wall has a first surface facing toward the flow path and a second surface facing away from the flow path, and wherein a radial space is defined between the first retaining feature and the second surface of the second wall.

6. The nozzle assembly of claim 1, wherein the first retaining feature is one of a ring clip, a dowel pin, and a nut.

7. The nozzle assembly of claim 1, wherein the first retaining feature is one or more plies.

8. The nozzle assembly of claim 7, wherein the one or more plies are laid up and are secured to the first vane outside of the flow path.

9. The nozzle assembly of claim 1, wherein the first retaining feature is a bonding material.

10. The nozzle assembly of claim 9, wherein the bonding material is a braze-type bonding.

11. The nozzle assembly of claim 1, wherein the first vane defines a locating end recess, and wherein the first retaining feature is a locating barbed ring that is received within the locating end recess and compressed between the first vane and the second wall.

12. The nozzle assembly of claim 1, wherein the first vane defines a mounting end recess, and wherein a mounting barbed ring is received within the mounting end recess and compressed between the first vane and the first wall.

13. The nozzle assembly of claim 1, wherein the first wall defines a second through opening through which the second vane extends, the second vane being secured by the second retaining feature outside of the flow path.

14. A nozzle assembly for a turbine engine, comprising:
a first wall defining a first mounting opening having a first insertion end;
a second wall spaced from the first wall, the first wall and the second wall defining a flow path, the second wall defining a second mounting opening having a second insertion end;
a first vane positioned at least in part within the flow path and extending between a first end and a second end of the first vane, the first end of the first vane having a first mounting flange positioned within the first mounting opening and wedgingly engaged with the first wall, the second end of the first vane being secured to the second wall, a second vane positioned at least in part within the flow path and extending between a first end and a second end of the second vane, the first end of the second vane having a second mounting flange positioned within the second mounting opening and wedgingly engaged with the second wall, the second end of the second vane being secured to the first wall, and wherein the first and second mounting flanges each have a respective sealing portion having angled surfaces that are shaped complementary to angled surfaces of the respective first and second walls that define the respective first and second mounting openings, the angled surfaces defining the first and second mounting openings diverge as they extend toward the respective first and second insertion ends of the respective first and second mounting openings, the angled surfaces of the sealing portions and the angled surfaces defining the first and second mounting openings wedgingly engage the respective first and second mounting flanges with the first and second walls respectively.

15. The nozzle assembly of claim 14, wherein the first mounting flange of the first vane is positioned entirely within the first mounting opening of the first wall.

16. The nozzle assembly of claim 14, wherein the first wall has a first surface and a second surface, and wherein the first mounting flange extends between the first surface and the second surface.

17. The nozzle assembly of claim 14, wherein the first wall has a radial thickness and the first mounting flange has a radial thickness, and wherein the radial thickness of the first mounting flange is less than the radial thickness of the first wall.

18. The nozzle assembly of claim 14, wherein the first mounting opening has a flow path end, and wherein the angled surfaces defining the first mounting opening extend between the first insertion end and the flow path end.

19. A method for assembling a nozzle assembly for a turbine engine defining a radial direction, the method comprising:

inserting a first vane inward along the radial direction so that a locating end of the first vane is inserted through a locating opening defined by an inner wall of the nozzle assembly and so that a mounting flange of the first vane engages an outer wall of the nozzle assembly, the inner wall being spaced from the outer wall along the radial direction; and inserting a second vane outward along the radial direction so that a locating end of the second vane is inserted through a locating opening defined by the outer wall and so that a mounting flange of the second vane engages the inner wall of the nozzle assembly.

* * * * *